(12) United States Patent
Takemura et al.

(10) Patent No.: US 7,775,553 B2
(45) Date of Patent: Aug. 17, 2010

(54) VEHICLE OCCUPANT PROTECTION APPARATUS

(75) Inventors: Naoki Takemura, Wako (JP); Koji Ikeda, Wako (JP); Hiroyuki Hirayama, Wako (JP); Takashi Nakamura, Wako (JP); Hiroyuki Isayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/489,745

(22) Filed: Jun. 23, 2009

(65) Prior Publication Data

US 2009/0256336 A1 Oct. 15, 2009

Related U.S. Application Data

(62) Division of application No. 11/610,237, filed on Dec. 13, 2006, now abandoned.

(30) Foreign Application Priority Data

| Dec. 15, 2005 | (JP) | ............................. 2005-362270 |
| Dec. 15, 2005 | (JP) | ............................. 2005-362293 |
| Dec. 15, 2005 | (JP) | ............................. 2005-362304 |

(51) Int. Cl.
*B60R 21/20* (2006.01)

(52) U.S. Cl. .................... 280/730.2; 280/729; 280/742; 280/743.1; 280/743.2

(58) Field of Classification Search ............... 280/729, 280/730.2, 742, 743.1, 743.2
See application file for complete search history.

(56) References Cited

U.S. PATENT DOCUMENTS

| 6,142,507 A | 11/2000 | Okuda et al. |
| 6,170,860 B1 * | 1/2001 | Denz et al. ............... 280/730.2 |
| 6,199,898 B1 | 3/2001 | Masuda et al. |
| 6,203,058 B1 | 3/2001 | Elqadah et al. |
| 6,237,941 B1 | 5/2001 | Bailey et al. |
| 6,352,283 B1 * | 3/2002 | Ellerbrok et al. ......... 280/743.1 |
| 6,394,487 B1 | 5/2002 | Heudorfer et al. |
| 6,431,590 B1 * | 8/2002 | Bakhsh et al. ........... 280/730.2 |
| 6,457,742 B1 * | 10/2002 | Brucker ................... 280/730.2 |
| 6,796,577 B2 | 9/2004 | Challa et al. |
| 6,802,530 B2 * | 10/2004 | Wipasuramonton et al. ....................... 280/730.2 |
| 6,866,293 B2 | 3/2005 | Ogata |
| 7,581,755 B2 * | 9/2009 | Nagai et al. .............. 280/743.1 |
| 2003/0234523 A1 | 12/2003 | Henderson et al. |
| 2006/0066079 A1 | 3/2006 | Inoue et al. |
| 2006/0131847 A1 | 6/2006 | Sato et al. |

FOREIGN PATENT DOCUMENTS

| JP | 138857 | 5/1998 |
| JP | 2001-1922 | 4/2001 |
| JP | 2001-171471 | 6/2001 |
| JP | 2003-175792 | 6/2003 |
| JP | 2003-320920 | 11/2003 |

* cited by examiner

*Primary Examiner*—Ruth Ilan
*Assistant Examiner*—James English
(74) *Attorney, Agent, or Firm*—Rankin, Hill & Clark LLP

(57) ABSTRACT

A vehicle occupant protection apparatus for use in a vehicle includes an occupant-protecting expansion part caused to expand in the form of a curtain in the vehicle cabin along windows. The expansion part is attached to the vehicle body at two attachment points positioned forward and rearward of the windows. A tension line that joins the two attachment points is in a position where the expansion part is extended between the two points, and is positioned below the lower edges of the windows.

4 Claims, 21 Drawing Sheets

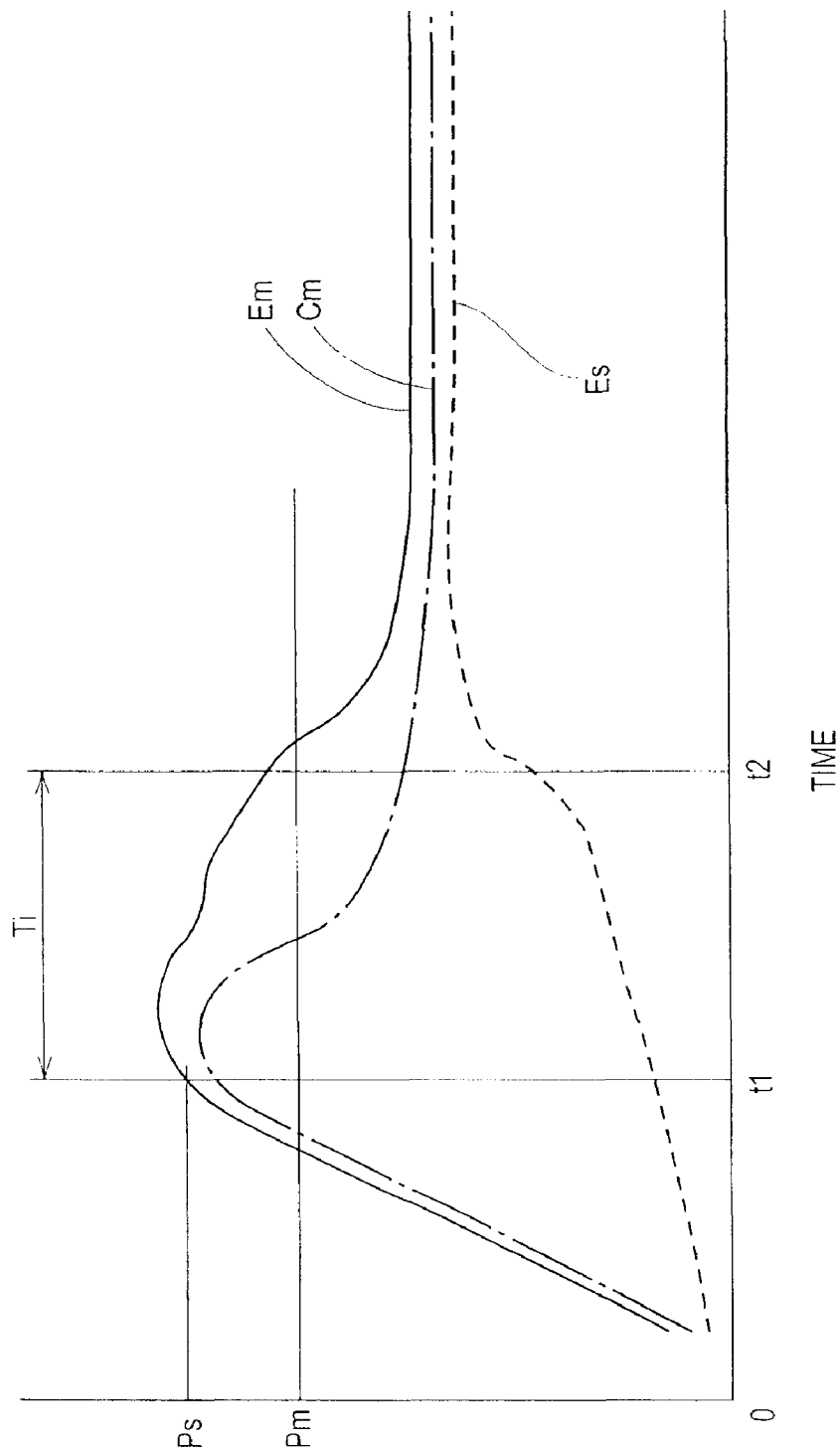

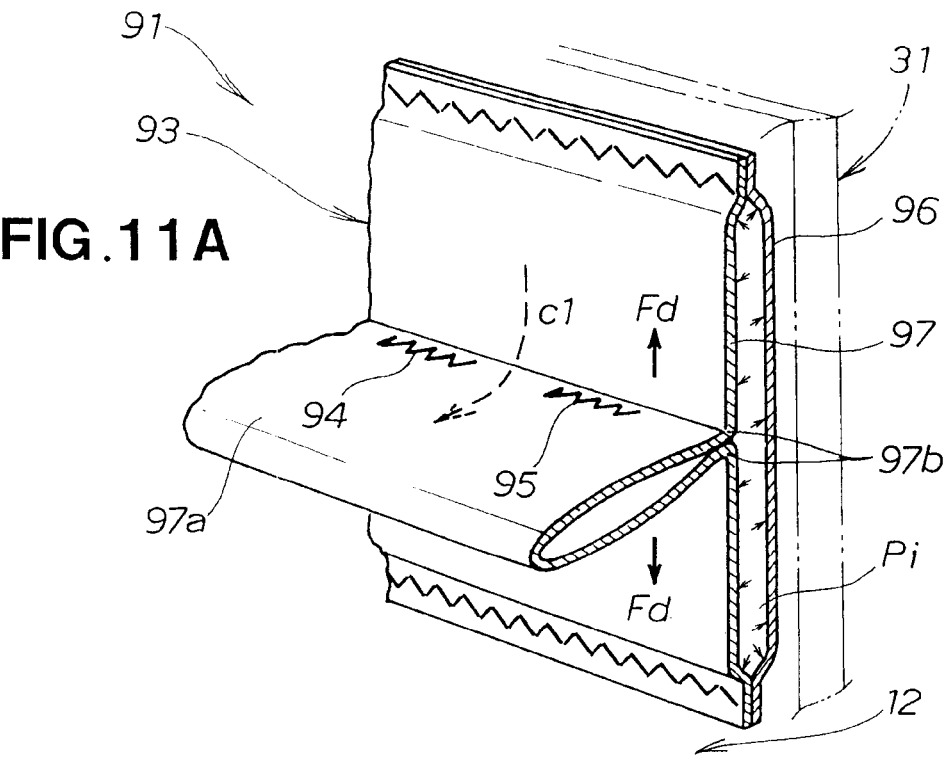
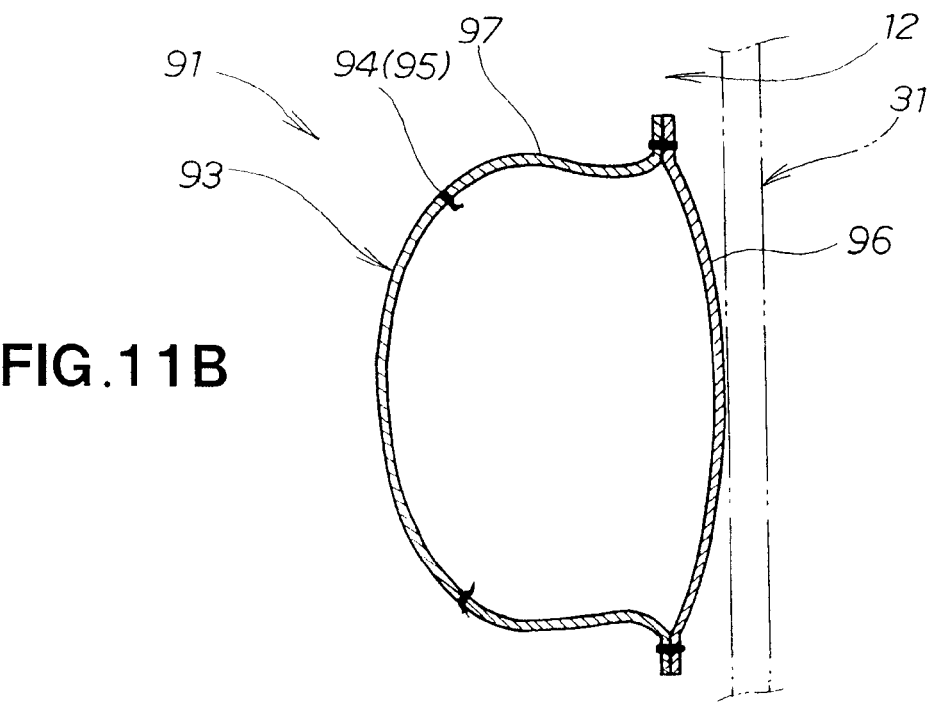

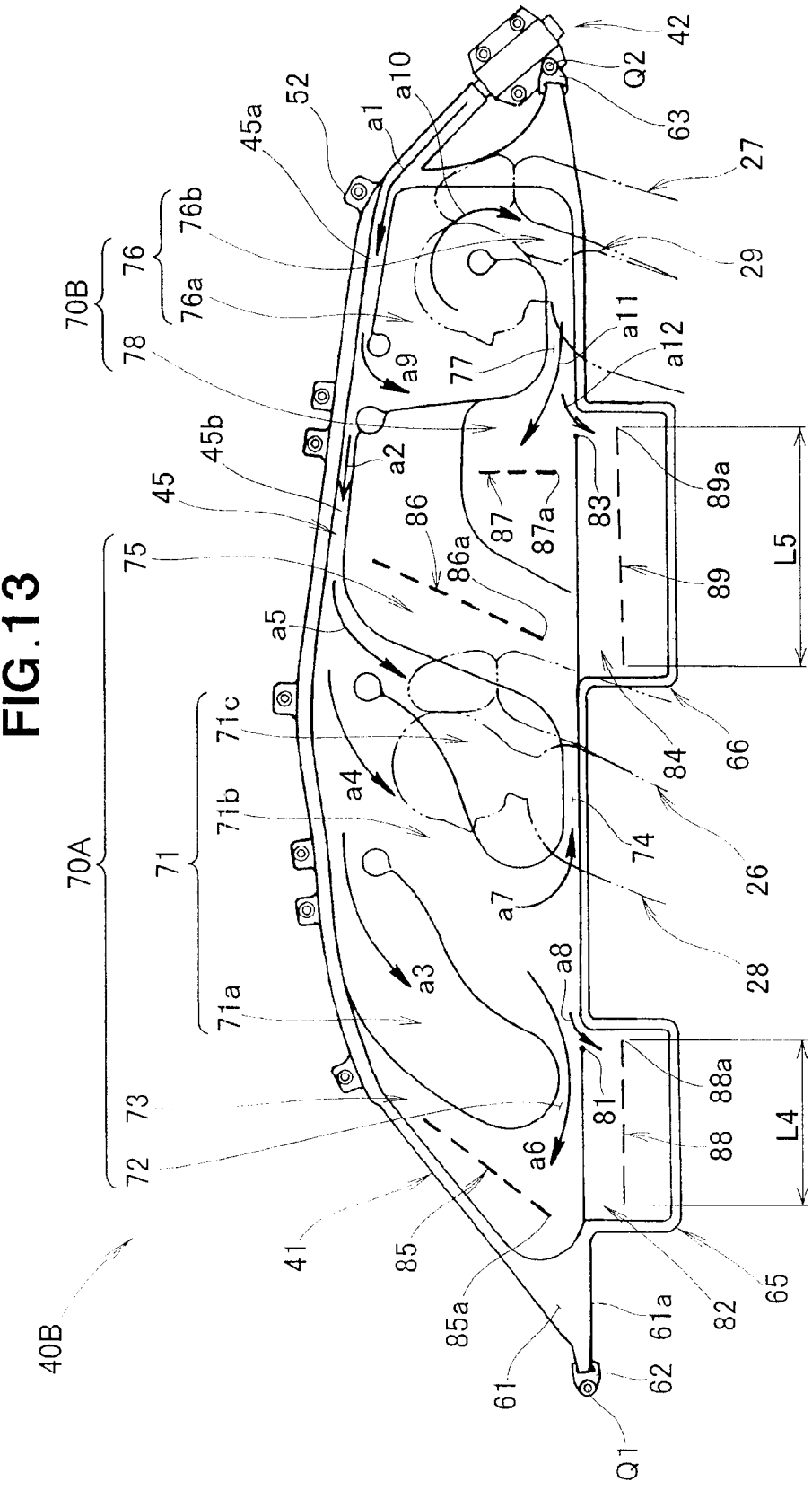

VEHICLE OCCUPANT PROTECTION APPARATUS

FIELD OF THE INVENTION

The present invention relates to a vehicle occupant protection apparatus made to cover a window by causing an occupant-protecting expansion part to expand in the form of a curtain on a side of a vehicle cabin when the side of the vehicle is subjected to a force of impact.

BACKGROUND OF THE INVENTION

One type of vehicle occupant protection apparatus specifically increases the ability to protect the heads of the vehicle occupants when a side of the vehicle is subjected to an impact force from the outside. In this vehicle occupant protection apparatus, a folded expansion part is positioned in a location stretching from the roof of the vehicle to an upper edge of a window. The expansion part is a member capable of mitigating impact force. Side curtain airbag apparatuses are a well-known example of this type of vehicle occupant protection apparatus.

With side curtain airbag apparatuses, a side curtain airbag expands along windows, and specific components are inflated when the vehicle body has been subjected to a specific impact force. Since side curtain airbags expand in the form of a curtain, side curtain airbags can be regarded as a type of expansion part. JP-10-138857A, JP-2001-1714171A, and JP-2003-320920A are well-known examples of this type of side curtain airbag apparatus.

A summary of the technology known from JP-10-138857A will first be described based on FIG. 20 hereof.

As shown in FIG. 20, in a first conventional side curtain airbag apparatus 220 (vehicle occupant protection apparatus), a side curtain airbag 223 (expansion part), which is stored on a side edge of a roof 222 of a vehicle 221, is made to expand in the form of a curtain along a forward window 228 and a rear window 229 in the vehicle cabin A forward end of the airbag 223 is attached to a lower portion of a front pillar 225 by a forward support part 224. A rear end of the airbag 223 is attached to a rear portion of a roof rail 227 by a rear support part 226. The forward support part 224 and the rear support part 226 are positioned above a lower edge 228a of the forward window 228 and a lower edge 229a of the rear window 229.

A tension line TL joining the forward support part 224 and the rear support part 226 is a diagonal line sloping down to the front and facing the forward window 228 and the rear window 229. When expanded, the airbag 223 is in an extended state in the longitudinal direction of the vehicle 221 between the two points 224 and 226 along the tension line TL, as shown in FIG. 20.

In the expanded airbag 223, a lower half 223a, which is below the tension line TL, does not contact the vehicle body 221. Therefore, the lower half 223a slackens more readily than an upper half 223b in the widthwise direction of the vehicle.

A measure that can be conceived for addressing this problem involves increasing the tensile force for extending the airbag 223 in the longitudinal direction of the vehicle 221 in order for the vehicle occupants in the lower half 223a to be given greater protection. However, in order to increase the tensile force, a stronger structure is necessary for the forward support part 224 and the rear support part 226, which becomes a primary factor in increasing the cost and weight of the side curtain air bag apparatus 220.

Next, a summary of the technology known from JP-2001-171471A will be described with reference to FIG. 21 hereof.

As shown in FIG. 21, a second conventional side curtain airbag apparatus 230 (vehicle occupant protection apparatus) has a side curtain airbag 231 (expansion part) configured with one primary expansion part 233 and four secondary expansion parts 234 through 237. In this case, the straight line 232 extending along the lower edges of the windows of the vehicle will be referred to as the lower line 232.

In the expanded airbag 231, the primary expansion part 233 is above the lower line 232 and is elongated in the longitudinal direction of the vehicle body. The primary expansion part 233 is provided with two primary inflation parts 241, 242 for protecting the vehicle occupants. The first and second primary inflation parts 241, 242 are arranged in a row in the longitudinal direction of the vehicle.

In the expanded airbag 231, the secondary expansion parts 234 through 237 are below the lower line 232, and extend downward from the lower edge of the primary expansion part 233. The secondary expansion parts 234 through 237 are arranged in a row in the longitudinal direction of the vehicle body and are each provided with a separate secondary inflation part 244 through 247. From forward to rear, the four secondary inflation parts 244 through 247 are a first secondary inflation part 244, a second secondary inflation part 245, a third secondary inflation part 246, and a fourth secondary inflation part 247. The second secondary inflation part 245 is positioned directly below the first primary inflation part 241. The fourth secondary inflation part 247 is positioned directly below the second primary inflation part 242.

The two primary inflation parts 241, 242 and the four secondary inflation parts 244 through 247 can be inflated by gas fed from an inflator 251. The primary inflation parts 241, 242 can protect the vehicle occupants by inflating. When inflated, the secondary inflation parts 244 through 247 support the lower edge of the expanded primary expansion part 233 by contacting the inner surface of the vehicle cabin (including the inner surface of the door).

The second secondary inflation part 245 is positioned in an area near the sitting location of the forward vehicle occupant. The fourth secondary inflation part 247 is positioned in an area near the sitting location of a rear vehicle occupant. When the airbag 231 expands, the second and fourth secondary inflation parts 245, 247 must quickly inflate and enter the space between the lateral surface of the vehicle cabin and the vehicle occupants in the front and rear. A vehicle occupant may, for example, come into contact with the expanded second secondary inflation part 245 before the secondary inflation part 245 has inflated. In such instances it is difficult for the second secondary inflation part 245 to fully expand.

A measure that can be conceived for addressing this problem involves increasing the flow rate of gas produced by the inflator 251 so that the second and fourth secondary inflation parts 245, 247 will inflate more quickly in order to increase the ability with which the vehicle occupants will be protected by the airbag 231. However, the inflator 251 will be larger, which becomes a primary factor in increasing the cost and weight of the side curtain airbag apparatus 230.

Next, a summary of the technology known from JP-2003-320920A will be described with reference to FIG. 22 hereof.

As shown in FIG. 22, a third conventional side curtain airbag apparatus 240 (vehicle occupant protection apparatus) has a side curtain airbag 241 (expansion part) provided with two primary inflation parts 242, 243 and two secondary inflation parts 244, 245.

The first and second primary inflation parts 242, 243 are arranged in a row in the longitudinal direction of the vehicle body and are inflated by gas fed from an inflator, absorbing the impact received by the vehicle occupants.

The first secondary inflation part 244 adjusts the internal pressure of the first primary inflation part 242 and is positioned adjacent to the first primary inflation part 242. A first break part 246, which can be broken by the internal pressure of the first primary inflation part 242, forms a partition between the first primary inflation part 242 and the first secondary inflation part 244.

The second secondary inflation part 245 adjusts the internal pressure of the second primary inflation part 243 and is positioned adjacent to the second primary inflation part 243. A second break part 247, which can be broken by the internal pressure of the second primary inflation part 243, forms a partition between the second primary inflation part 243 and the second secondary inflation part 245.

For example, the first break part 246 breaks when the internal pressure of the first primary inflation part 242 exceeds a reference pressure through contact made between a vehicle occupant and the inflated first primary inflation part 242. The space between the first primary inflation part 242 and the first secondary inflation part 244 will suddenly open as a result. At this point, the gas within the first primary inflation part 242 flows into the first secondary inflation part 244 all at once. The pressure within the first primary inflation part 242 immediately decreases.

The internal pressure of the first primary inflation part 242 can preferably be kept at a specific pressure for a specific period of time in order to increase the ability to protect the vehicle occupants with the airbag 241 when the side of the vehicle is subjected to an impact force. In this way, the impact received by the vehicle occupants can be adequately absorbed.

Accordingly, a demand exists for a technique that can achieve a lighter, less expensive vehicle occupant protection apparatus while increasing the ability of the vehicle occupant protection apparatus to protect the vehicle occupants.

SUMMARY OF THE INVENTION

According to a first aspect of the present invention, there is provided a vehicle occupant protection apparatus comprising an expansion part that is positioned in a folded state along an upper edge of a vehicle window and is capable of expanding in the form of a curtain along the window in a vehicle cabin in order to protect a vehicle occupant, the vehicle occupant protection apparatus further comprising a tension line for connecting two attachment points that are selected from a plurality of attachment points for attaching the expansion part to the vehicle body and that are disposed forward and rearward of the window, wherein the tension line is in a position where the expansion part is extended between the two points and is disposed below a lower edge of the window.

Since the tension line is positioned below the lower edge of the window, the expanded curtain-form expansion part can cover the entire region from the upper edge to the lower edge of the window. When expanded, the expansion part also extends below the lower edge of the window between the two points.

The lower portion of the expansion part will thus be extended in the longitudinal direction of the vehicle body and, by remaining in contact with the vehicle body, will not slacken from the vehicle cabin to the outer side. The entirety of the expansion part therefore exhibits an ability to provide substantially uniform protection for the vehicle occupants. As a result, the vehicle occupant protection apparatus has an enhanced ability to protect the vehicle occupants.

Since the expansion part does not slacken from the vehicle cabin to the outer side, the tensile force needed for the expansion part to remain stretched in the longitudinal direction of the vehicle body need not be established to an extreme degree. Since only a small tensile force is sufficient, the strength of the two forward and rear attachment points can be reduced. Therefore, the vehicle occupant protection apparatus can be made lighter and less expensive, while having a better ability to protect the vehicle occupants. Since the vehicle occupant protection apparatus is inexpensive, the apparatus can be mounted on a variety of vehicles (including inexpensive vehicles). Therefore, vehicle occupant protection apparatuses can become widespread.

It is preferable that a lower edge of the expansion part is positioned substantially on the tension line when the expansion part is expanded.

Preferably, the expansion part further has an auxiliary secondary expansion part that expands below the tension line, the secondary expansion part being positioned in a location other than a location facing a sitting location of the vehicle occupant.

Desirably, the expansion part further has a primary inflation part that is inflated by the pressure of a gas, while the secondary expansion part further has a secondary inflation part that is inflated by the pressure of the gas.

Preferably, the secondary inflation part is in constant connection with the primary inflation part via a first communicating channel having a reduced diameter to adjust an internal pressure of the primary inflation part and has a first break part which is designed to break when subjected to a specific breaking force produced in accordance with an internal pressure of the secondary inflation part, the capacity of the secondary inflation part being allowed to be further increased as a result of the breaking.

In a preferred form, the first break part is set to a specific length.

Further, the secondary inflation part is preferably stored in a folded state on a surface of the primary inflation part on the side of the vehicle cabin.

Preferably, the primary inflation part has an occupant-protecting inflation part that inflates in a location facing the sitting location; and an internal-pressure-regulating inflation part that is capable of being inflated in a location set apart from the sitting location, wherein the internal-pressure-regulating inflation part is in constant connection with the occupant-protecting inflation part via a second communicating channel having a reduced diameter to adjust the internal pressure of the occupant-protecting inflation part, and has a second break part, the second break part being designed to break when subjected to a specific breaking force produced in accordance with an internal pressure of the internal-pressure-regulating inflation part, the capacity of the internal-pressure-regulating inflation part being allowed to be further increased after the breaking than before.

Further, the second break part is preferably set to a specific length.

Further, the second break part is preferably provided to a lateral surface of the internal-pressure-regulating inflation part.

According to a second aspect of the present invention, there is provided a vehicle occupant protection apparatus comprising an expansion part that is positioned in a folded state along an upper edge of a vehicle window and is capable of expanding in the form of a curtain along the window in a vehicle cabin in order to protect a vehicle occupant. The expansion part includes an auxiliary secondary expansion part for expanding below the window. The secondary expansion part is positioned in a location other than a location that faces a sitting location of the vehicle occupant.

Thus, when the expansion part is expanded, the secondary expansion part contacts a portion of the vehicle body below the lower edge of the window. In other words, the lower portion of the expansion part is supported by the vehicle body via the secondary expansion part, and therefore the expansion part has high rigidity. Having high rigidity, the expansion part does not easily slacken from the side of the vehicle cabin to the outer side. The entirety of the expansion part therefore exhibits an ability to provide substantially uniform protection for the vehicle occupants. The capability of the vehicle occupant protection apparatus to protect the vehicle occupants can accordingly be further increased using a simple configuration wherein the expansion part is merely provided with an auxiliary secondary expansion part. Since the apparatus is merely provided with a secondary expansion part, a lighter, less expensive vehicle occupant protection apparatus can be achieved. Further, the secondary expansion part is only positioned in locations that do not face a sitting location of a vehicle occupant. When the expansion part is expanded, the secondary expansion part need not enter the space between the vehicle occupants and the windows. The expansion of the expansion part and the secondary expansion part is simple. As a result, the ability of the vehicle occupant protection apparatus to protect the vehicle occupants can be further increased.

Preferably, the expansion part has a primary inflation part that is inflated by the pressure of a gas, and the secondary expansion part further has a secondary inflation part that is inflated by the pressure of the gas.

The secondary inflation part is preferably in constant connection with the primary inflation part via a first communicating channel having a reduced diameter to adjust the internal pressure of the primary inflation part, and has a first break part; and the first break part is designed to break when subjected to a specific breaking force produced in accordance with an internal pressure of the secondary inflation part, and the capacity of the secondary inflation part is allowed to be further increased as a result of the breaking.

The first break part is preferably set to a specific length.

Desirably, the secondary inflation part is stored in a folded state on a surface of the primary inflation part on the side of the vehicle cabin.

In a preferred form, the primary inflation part has an occupant-protecting inflation part that inflates in a location facing the sitting location; and an internal-pressure-regulating inflation part that is capable of being inflated in a location set apart from the sitting location. The internal-pressure-regulating inflation part is in constant connection with the occupant-protecting inflation part via a second communicating channel having a reduced diameter to adjust the internal pressure of the occupant-protecting inflation part, and has a second break part. The second break part is designed to break when subjected to a specific breaking force produced in accordance with an internal pressure of the internal-pressure-regulating inflation part. The capacity of the internal-pressure-regulating inflation part is allowed to be further increased as a result of the breaking.

The second break part may be set to a specific length.

Preferably, one end of the second break part faces the second communicating channel, while the second break part extends inward within the internal-pressure-regulating inflation part.

The second break part is preferably provided to a lateral surface of the internal-pressure-regulating inflation part.

BRIEF DESCRIPTION OF THE DRAWINGS

Certain preferred embodiments of the present invention will be described in more detail below, by way of example only, with reference to the accompanying drawings, in which:

FIG. 10 is a graph showing the pressure characteristics of the occupant-protecting inflation part and the first internal-pressure-regulating inflation part shown in FIG. 6;

FIGS. 11A and 11B are views illustrating a first modification of the first internal-pressure-regulating inflation part according to the second embodiment of the present invention;

FIG. 13 is a view showing the expanded state of a side curtain airbag of a vehicle occupant protection apparatus according to a third embodiment of the present invention;

DESCRIPTION OF THE PREFERRED EMBODIMENTS

A vehicle occupant protection apparatus according to a first embodiment will first be described based on FIGS. 1 through 5.

Figure 1:
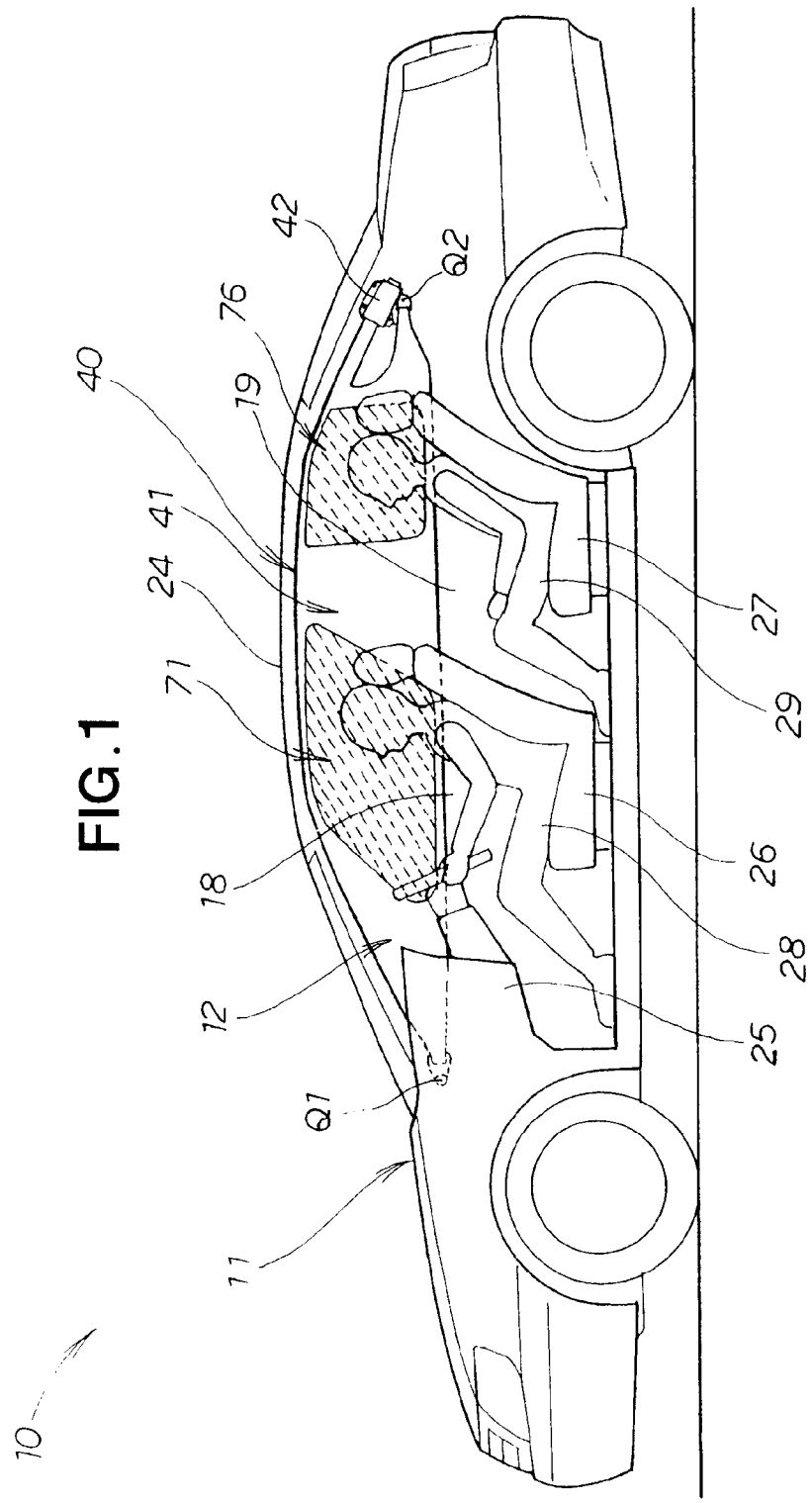
FIG. 1 is a side elevational view illustrating a vehicle equipped with a vehicle occupant protection apparatus according to a first embodiment of the present invention.
Figure 2:
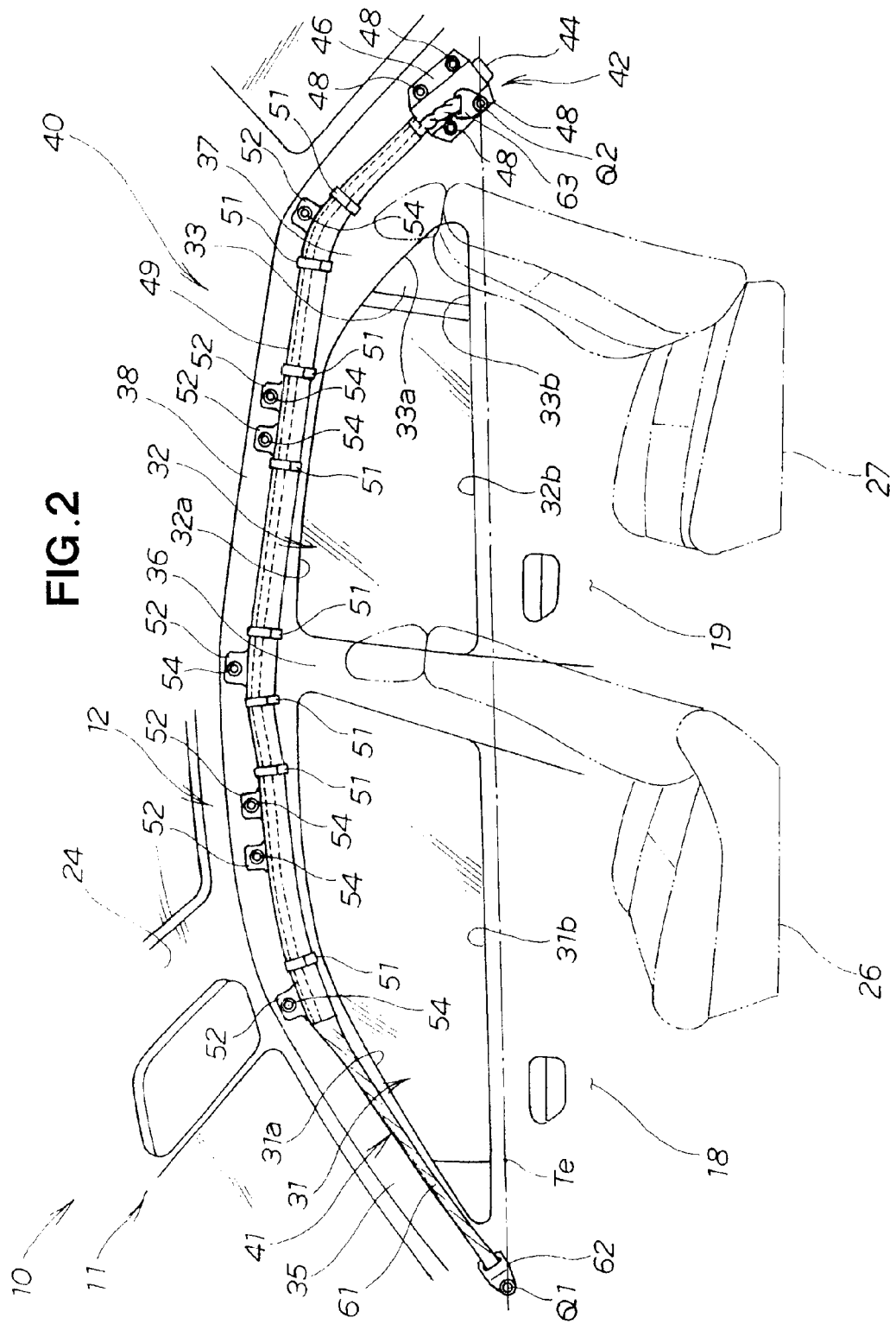
FIG. 2 is a perspective view illustrating a vehicle cabin before operation of the vehicle occupant protection apparatus shown in FIG. 1.

FIG. 1 shows a vehicle 10 equipped with a vehicle occupant protection apparatus 40 according to the first embodiment. As shown in FIGS. 1 and 2, the vehicle 10 has a monocoque vehicle body 11 and is provided with two seats 26, 27, i.e., a front seat 26 and a back seat 27, in the front and rear of a vehicle cabin 12. The front seat 26 is the sitting location for a driver or other vehicle occupant 28, and the back seat 27 is the sitting location for a vehicle occupant 29.

The vehicle body 11 has a front pillar 35 in the forward portion, a center pillar 36 in the middle portion, a rear pillar 37 in the back portion, and a roof side-rail 38 that joins the upper ends of each pillar 35, 36, 37. The roof side-rail 38 supports a roof 24 and is an elongated member running lengthwise along the vehicle body 11. In other words, the roof side-rail 38 is provided along the side edge of the roof 24.

The vehicle body 11 is provided with a front side-door 18 in the opening between the front pillar 35 and the center pillar 36, and is also provided with a rear side-door 19 in the opening between the center pillar 36 and the rear pillar 37.

Turning now to FIG. 2, the front side-door 18 has a window 31 in the upper half thereof and is positioned adjacent to the front seat 26. The rear side-door 19 has a window 32 and a quarter window 33 in the upper half thereof, and is positioned adjacent to the back seat 27.

As shown in FIG. 2, the vehicle occupant protection apparatus 40 is positioned on the roof side-rail 38. Specifically, the vehicle occupant protection apparatus 40 is attached so that a side curtain airbag 41 in a stored state (folded or rolled up) runs along the side edge of the roof 24; i.e., along the upper edges 31a, 32a, 33a of the windows 31, 32, 33 of the vehicle body 11. The side curtain airbag 41 will be referred below simply as "the airbag 41."

The vehicle occupant protection apparatus 40 produces gas from an inflator 42 when the side of the vehicle 10 is subjected to an impact force equal to or greater than a set level. This gas is fed into the airbag 41, which thereby inflates on the side of the vehicle cabin 12 along each of the windows 31, 32, 33. Such a vehicle occupant protection apparatus 40 is referred to as a "side curtain airbag apparatus."

After expanding within the vehicle cabin 12, the airbag 41 covers each of the windows 31, 32, 33, and can protect the vehicle occupants 28, 29 by evenly absorbing the impact acting on the vehicle occupants 28, 29 sitting in each seat 26, 27.

The inflator 42 (gas feed source 42) is composed of an inflator main body 44, which produces the gas, and an attachment bracket 46, which is integrated with the inflator main body 44. The inflator main body 44 is connected to a gas introduction part 45 of the airbag 41 (see FIG. 3). The gas produced by the inflator 42 is introduced into the airbag 41 from a lateral surface of the gas introduction part 45. The attachment bracket 46 of the inflator main body 44 is attached to the rear pillar 37 by four bolts 48.

Figure 3:
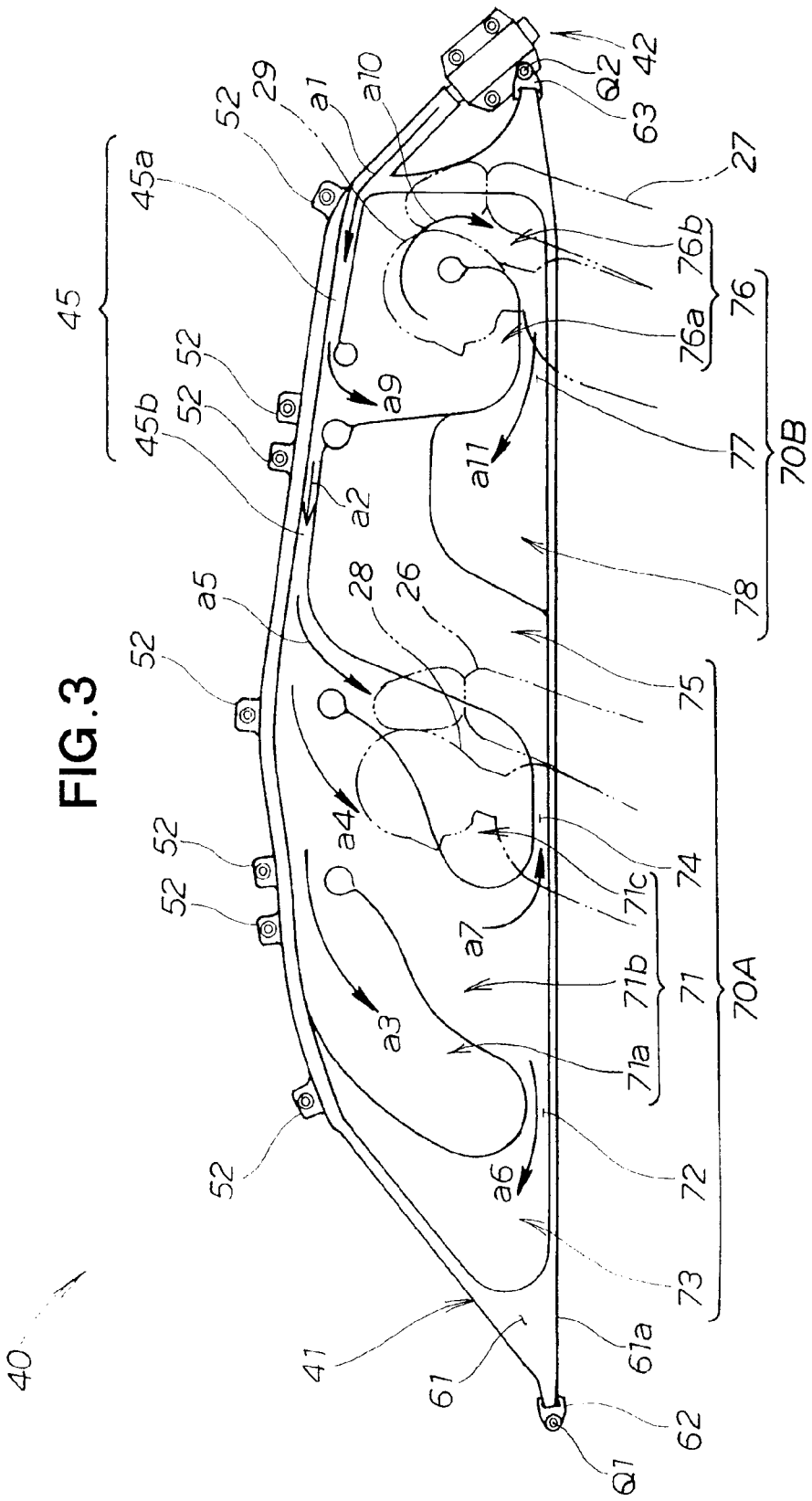
FIG. 3 is a schematic view showing an expanded state of the side curtain airbag shown in FIG. 2.
Figure 4:
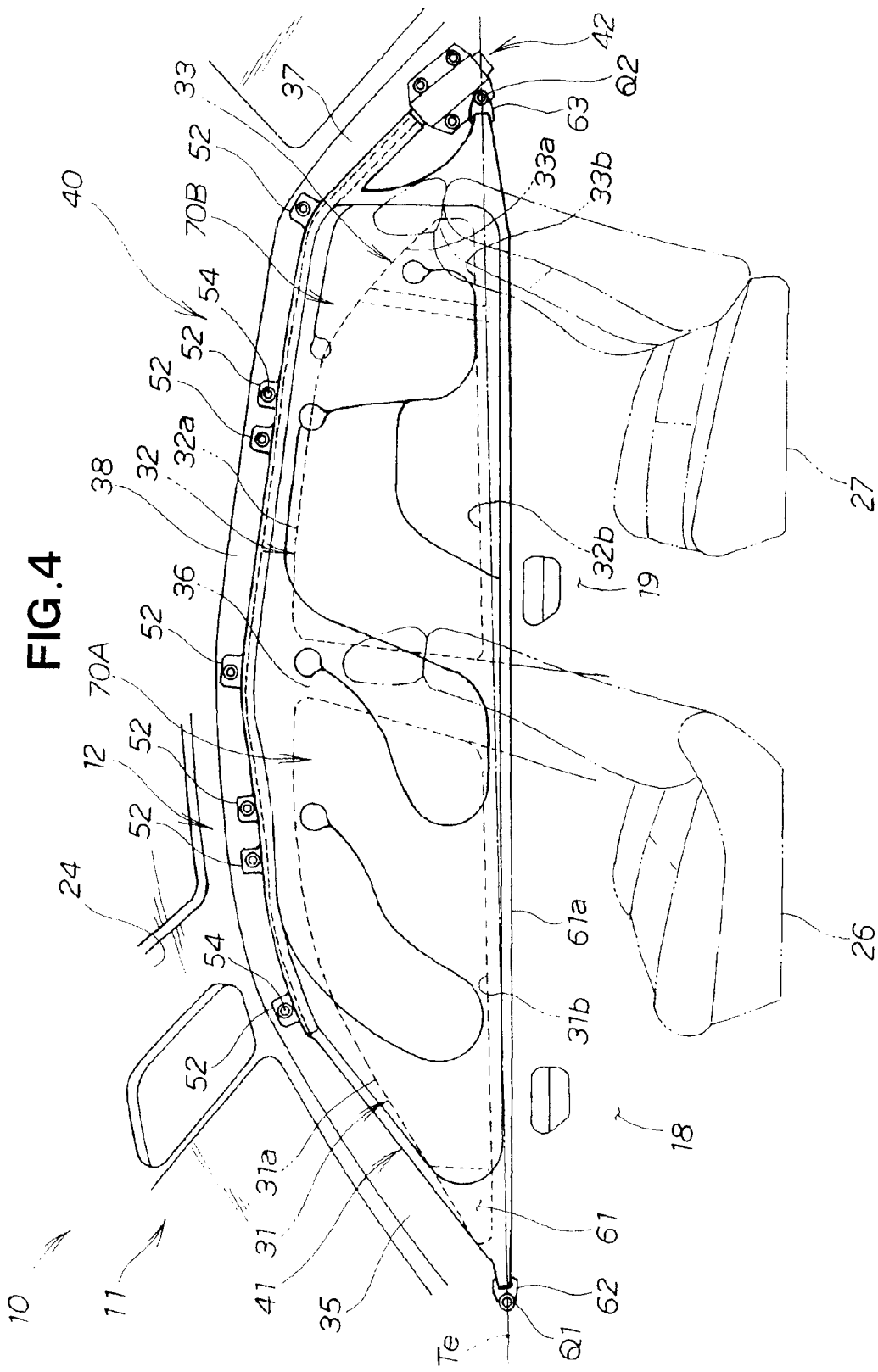
FIG. 4 is a perspective view of the vehicle cabin after operation of the vehicle occupant protection apparatus shown in FIG. 1.

Next, the airbag 41 will be described in detail. FIG. 3 shows the airbag 41 in an expanded state. FIG. 4 shows the airbag 41 in an expanded state within the vehicle cabin 12. The airbag 41 has a construction combining pliable sheets of airtight fabric or the like, for example. The airbag 41 is composed of the gas introduction part 45 through which gas is introduced from the inflator 42, and an expansion part 61, which covers each of the windows 31, 32, 33 in the form of a curtain (see FIG. 4).

The expansion part 61 is a sheet-form member capable of expanding in the form of a curtain within the vehicle cabin 12 along each of the windows 31, 32, 33 to protect the vehicle occupants 28, 29. The expansion part 61 inflates via gas pressure, and is provided with two primary forward and rear inflation parts 70A, 70B. The two primary inflation parts 70A, 70B are inflatable in the widthwise direction of the vehicle (the direction from the front to the back of the page in FIG. 3). The first primary inflation part 70A is positioned on the forward half of the expansion part 61. The second primary inflation part 70B is positioned on the rear half of the expansion part 161.

The first primary inflation part 70A is composed of one occupant-protecting inflation part 71 and two internal-pressure-regulating inflation parts 73, 75.

The first occupant-protecting inflation part 71 is a component of the first primary inflation part 70A and inflates in a location facing the front seat 26 (the sitting location 26 of the vehicle occupant 28). The first occupant-protecting inflation part 71 is composed of three chambers arranged in a single line in order c from front to back: a forward chamber 71a, a central chamber 71b, and a rear chamber 71c. The three chambers 71a, 71b, 71c are connected together at locations on upper portions thereof.

The two internal-pressure-regulating inflation parts 73, 75 adjust the internal pressure of the first occupant-protecting inflation part 71 and are arranged on the front and rear of the first occupant-protecting inflation part 71. More specifically, the first internal-pressure-regulating inflation part 73 is positioned forwardly of the occupant 28 seated in the front seat 26, whilst the second internal-pressure-regulating inflation part 75 is positioned between the front seat 26 and the upper body half of the occupant 29 seated in the back seat 27. The two internal-pressure-regulating inflation parts 73, 75 are therefore inflatable in locations removed from the sitting location 26.

The first internal-pressure-regulating inflation part 73 is positioned adjacent to the front of the forward chamber 71a and is in constant connection solely to the first occupant-protecting inflation part 71 by a forward communicating channel 72. The forward communicating channel 72 (reduced-diameter part 72) passes through the lower side of the forward chamber 71a, connecting the central chamber 71b and the first internal-pressure-regulating inflation part 73. The forward communicating channel 72 has a reduced diameter (i.e., is established with a relatively small diameter) in order to limit the flow rate of gas.

The second internal-pressure-regulating inflation part 75 is positioned adjacent to the back of the rear chamber 71c and is in constant connection solely to the first occupant-protecting inflation part 71 by a central communicating channel 74. The central communicating channel 74 (reduced-diameter part 74) passes through the lower side of the rear chamber 71c, connecting the central chamber 71b and the second internal-pressure-regulating inflation part 75. The central communicating channel 74 has a reduced diameter in order to limit the flow rate of gas.

The second primary inflation part 70B is composed of one occupant-protecting inflation part 76 and one internal-pressure-regulating inflation part 78.

The second occupant-protecting inflation part 76 is a component of the second primary inflation part 70B and inflates in a location facing the rear seat 27 (the sitting location 27 of the vehicle occupant 29). The second occupant-protecting inflation part 76 is composed of two chambers arranged in a single line in order from front to back: a forward chamber 76a and a rear chamber 76b. The two chambers 76a, 76b are connected together at locations on upper portions thereof.

The third internal-pressure-regulating inflation part 78 adjusts the internal pressure of the second occupant-protecting inflation part 76 and is arranged forwardly of the second occupant-protecting inflation part 76. In other words, the third internal-pressure-regulating inflation part 78 adjoins the front of the forward chamber 76a. More specifically, the third internal-pressure-regulating inflation part 78 is positioned between the front seat 26 and the upper body half of the occupant 29 seated in the back seat 27. The third internal-pressure-regulating inflation part 78 is therefore inflatable in a location set apart from the sitting location 27.

The third internal-pressure-regulating inflation part 78 is positioned between the second interned-pressure-regulating inflation part 75 and the forward chamber 76a, and is in constant connection solely to the second occupant-protecting inflation part 76 by a rear communicating channel 77. The rear communicating channel 77 (reduced-diameter part 77) passes through the lower side of the forward chamber 76a, connecting the rear chamber 76b and the third internal-pressure-regulating inflation part 78. The rear communicating channel 77 has a reduced diameter in order to limit the flow rate of gas.

"Second communicating channels 72, 74, 77" will be used below as a generic term for the three communicating channels 72, 74, 77.

The gas introduction part 45 is composed of a first introduction part 45a and a second introduction part 45b. The first introduction part 45a is composed of a pipe-form connection tube through which gas from the inflator 42 is introduced into the second occupant-protecting inflation part 76. The second introduction part 45b is composed of a pipe-form connection tube through which gas from the inflator 42 is introduced through the first introduction part 45a and into the first occupant-protecting inflation part 71.

As shown in FIGS. 3 and 4, the expansion part 61 is provided with a plurality of upper attachment parts 52, one forward attachment part 62, and one rear attachment part 63. The plurality of upper attachment parts 52 is composed of attachment pieces that extend up from an upper portion of the expansion part 61 when the part is expanded, and is arranged in a row along the roof side-rail 38. The upper attachment parts 52 are attached to the roof side-rail 38 by bolts 54.

The forward attachment part 62 is composed of an attachment piece that extends forward from the forward portion of the lower end of the expansion part 61 when the part is expanded. The rear attachment part 63 is composed of an attachment piece that extends rearward from the rear portion of the lower end of the expansion part 61 when the part is expanded.

Figure 5:
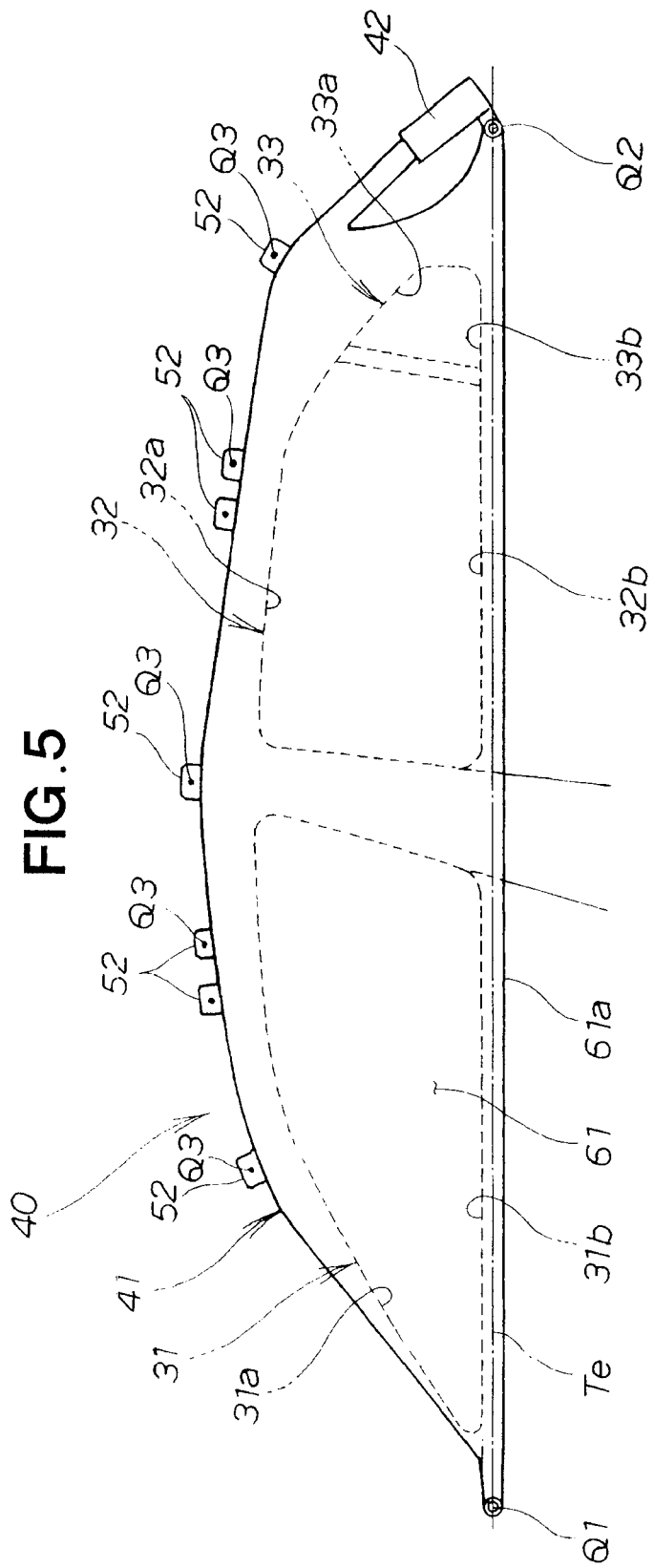
FIG. 5 is a schematic view showing an expanded state of the side curtain airbag shown in FIG. 3.

As shown in FIGS. 4 and 5, the forward attachment part 62 is attached to the vehicle body 11 at a forward attachment point Q1 so as to be able to swing up and down. The forward attachment point Q1 is positioned in front of the windows 31, 32, 33 and below the lower edges 31b, 32b, 33b of the windows 31, 32, 33.

The rear attachment part 63 is attached to the vehicle body 11 at a rear attachment point Q2 so as to be able to swing up and down. The rear attachment point Q2 is positioned behind the windows 31, 32, 33 and below the lower edges 31b, 32b, 33b of the windows 31, 32, 33. The attachment point Q2 is preferably positioned at substantially the same height as the attachment point Q1.

The expansion part 61 is thus attached to the vehicle body 11 by the forward attachment part 62 at the forward attachment point Q1, by the rear attachment part 63 at the rear attachment point Q2, and by the plurality of upper attachment parts 52 at each attachment point Q3 (see FIG. 5). A straight line Te, which is referred to as the "tension line Te," joins at least the two points Q1, Q2 of the plurality of attachment points Q1, Q2, Q3, with the attachment point Q1 positioned at the front, and the attachment point Q2 positioned at the rear with respect to the windows 31, 32, 33.

The tension line Te is positioned so that the expansion part 61 will be extended between the two points Q1, Q2. The tension line Te is substantially horizontal and is positioned below the lower edges 31b, 32b, 33b (the edges on the lower sides) of the windows 31, 32, 33. The tension line Te is preferably provided to the vicinity of the lower edges 31b, 32b, 33b.

Since the tension line Te is thus positioned below the lower edges 31b, 32b, 33b (the edges on the lower sides) of the windows 31, 32, 33, the expansion part 61 in an expanded curtain form can cover the entire area from the upper edges 31a, 32a, 33a (the edges on the upper sides) to the lower edges 31b, 32b, 33b of the windows 31, 32, 33. When expanded, the expansion part 61 will be extended between the two points Q1, Q2, which are below the lower edges 31b, 32b, 33b of the windows 31, 32, 33.

The portion of the expansion part 61 on the lower edge 61a will thus be extended in the longitudinal direction of the vehicle 11, will be in contact with the vehicle body 11 (including the doors 18, 19 provided with the windows 31, 32, 33), and will accordingly not slacken from the vehicle cabin 12 to the outer side. The entirety of the expansion part 61 exhibits an ability to provide substantially uniform protection for the vehicle occupants. As a result, the ability of the vehicle occupant protection apparatus 40 to protect the vehicle occupants is further improved.

The expansion part 61 does not slacken from the vehicle cabin 12 to the outer side. Therefore, the tensile force for extending the expansion part 61 in the longitudinal direction of the vehicle body 11 need not be very high. Since a small tensile force will be sufficient, the strength of the components at the two forward and rear points Q1, Q2 can be reduced. Therefore, a lighter, less expensive vehicle occupant protection apparatus 40 can be achieved, and the ability of the vehicle occupant protection apparatus 40 to protect the vehicle occupants can be enhanced. Since the vehicle occupant protection apparatus 40 is inexpensive, the apparatus can be mounted on a variety of vehicles (including inexpensive vehicles). Therefore, vehicle occupant protection apparatuses 40 can become widespread.

The components of the two forward and rear points Q1, Q2 are the forward and rear attachment parts 62, 63; the bolts or other elements used to attach the forward and rear attachment parts 62, 63; and the portions of the vehicle body 11 to which the attachment parts 62, 63 are attached.

When the expansion part 61 is expanded, the lower edge 61a of the expansion part 61 is located substantially on the tension line Te. The lower edge 61a is preferably formed below and in the vicinity of the tension line Te.

On extending downward to the tension line Te, which is positioned lower than the lower edges 31b, 32b, 33b of the windows 31, 32, 33, the expansion part 61 has the smallest possible dimensions necessary for protecting the vehicle occupants 28, 29. Each of the windows 31, 32, 33 can be completely covered by this smallest possible expansion part 61. Since the expansion part 61 is small, the vehicle occupant protection apparatus 40 can be made small.

Next, the stored state of the airbag 41 before expanding will be described.

As shown in FIG. 2, the folded expansion part 61 (see FIG. 3) and the gas introduction part 45 (see FIG. 3) of the pre-expansion airbag 41 are stored within a tube-shaped cover 49. The tube-shaped cover 49 is bundled by a plurality of straps 51.

The tube-shaped cover 49 and the plurality of straps 51 are formed with perforations (not shown) or the like at break points, for example, so that the tube-shaped cover 49 and the plurality of straps 51 can break due to the force of expansion of the airbag 41 when the airbag 41 inflates and expands.

Next the operation of the vehicle occupant protection apparatus 40 will be described.

When the side of the vehicle 10 shown in FIG. 2 is subjected to an impact force that is equal to or greater than a set level, the inflator 42 produces gas, which is fed into the airbag 41 is a result, the folded expansion part 61 expands on the side of the vehicle cabin 12 along each of the windows 31, 32, 33 as shown in FIGS. 3 and 4, protecting the vehicle occupants 28, 29.

The flow of gas in the expansion part 61 is shown by FIG. 3. Gas produced by the inflator 42 is introduced from the first introduction part 45a and the second introduction part 45b into the forward and occupant-protecting rear inflation parts 71, 76 as shown by arrows a1, a2.

Gas introduced from the second introduction part 45b flows into the forward chamber 71a, the central chamber 71b, and the rear chamber 71c of the first occupant-protecting inflation part 71, as shown by arrows a3, a4, a5. As a result, the first occupant-protecting inflation part 71 inflates and expands within the vehicle cabin 12.

At this time, gas in the central chamber 71b flows incrementally through the forward communicating channel 72 and into the forward internal-pressure-regulating inflation part 73, as shown by an arrow a6. Further, gas in the central chamber 71b flows incrementally through the central communicating channel 74 and into the rear internal-pressure-regulating inflation part 75, as shown by an arrow a7. As a result, the forward and rear internal-pressure-regulating inflation parts 73, 75 gradually inflate after the first occupant-protecting inflation part 71 has begun to inflate.

Meanwhile, the gas introduced from the first introduction part 45a flows into the forward chamber 76a of the second occupant-protecting inflation part 76, as shown by an arrow a9; and also flows from the forward chamber 76a into the rear chamber 76b, as shown by an arrow a10. As a result, the second occupant-protecting inflation part 76 inflates and expands within the vehicle cabin 12. At this time, gas in the rear chamber 76b flows incrementally through the third communicating channel 77 and into the forward internal-pressure-regulating inflation part 78, as shown by an arrow a11. As a result, the internal-pressure-regulating inflation part 78 gradually inflates after the second occupant-protecting inflation part 76 has begun to inflate.

The expansion part 61 is therefore provided with the primary inflation parts 70A, 70B. The ability to protect the vehicle occupants 28, 29 can be further enhanced via the primary inflation parts 70A, 70B, which have been inflated by gas pressure.

The internal pressure of the first occupant-protecting inflation part 71 will suddenly increase due, e.g., to the vehicle occupant 28 coming into contact with the inflated first occupant-protecting inflation part 71. As described above, the first occupant-protecting inflation part 71 is connected solely to the internal-pressure-regulating inflation parts 73, 75. The gas in the first occupant-protecting inflation part 71 flows solely into the internal-pressure-regulating inflation parts 73, 75 via the communicating channels 72, 74. Therefore, although the internal pressure of the first occupant-protecting inflation part 71 decreases, pressure is maintained at or above a level capable of protecting the vehicle occupant 28.

Furthermore, since the diameter of the communicating channels 72, 74 is constricted, the internal pressure of the first occupant-protecting inflation part 71 decreases relatively slowly. Therefore, sudden changes in the internal pressure of the first occupant-protecting inflation part 71 can be suppressed.

The first occupant-protecting inflation part 71 fully maintains an internal pressure capable of protecting the vehicle occupant 28 for a relatively long period of time. As a result, the first occupant-protecting inflation part 71 can receive and enfold the vehicle occupant 28, and more evenly absorb the impact received by the vehicle occupant 28.

A similar result occurs when the vehicle occupant 29 comes into contact with the inflated second occupant-protecting inflation part 76.

Additionally, the internal-pressure-regulating inflation parts 73, 75, 78 are inflatable in locations removed from the sitting locations 26, 27. When the internal-pressure-regulating inflation parts 73, 75, 78 inflate, inflation is not restricted by the vehicle occupants 28, 29. Therefore, the gas of the occupant-protecting first inflation part 71, 76 can easily flow out into the internal-pressure-regulating inflation parts 73, 75, 78. As a result, the internal-pressure-regulating inflation parts 73, 75, 78 can adequately adjust the internal pressure of the occupant-protecting inflation parts 71, 76.

The internal pressure of the occupant-protecting inflation parts 71, 76 can be adjusted by establishing the optimal hole diameter of the communicating channels 72, 74, 77. As a result, the amount of impact force absorbed can be regulated by the occupant-protecting inflation parts 71, 76.

Next, a vehicle occupant protection apparatus according to a second embodiment will be described based on FIGS. 6 through 10. Where the operation and configuration of the second embodiment are identical to the first embodiment shown in the above-mentioned FIGS. 1 through 5, the same notation is used and the associated description is omitted. The configuration of the second embodiment is also identical to the configuration shown in the above-mentioned FIGS. 1 and 2, which will be referenced as such. The contents of FIG. 6 correspond to those in the above-mentioned FIG. 3. The contents of FIG. 9 correspond to the above-mentioned FIG. 4.

Figure 6:
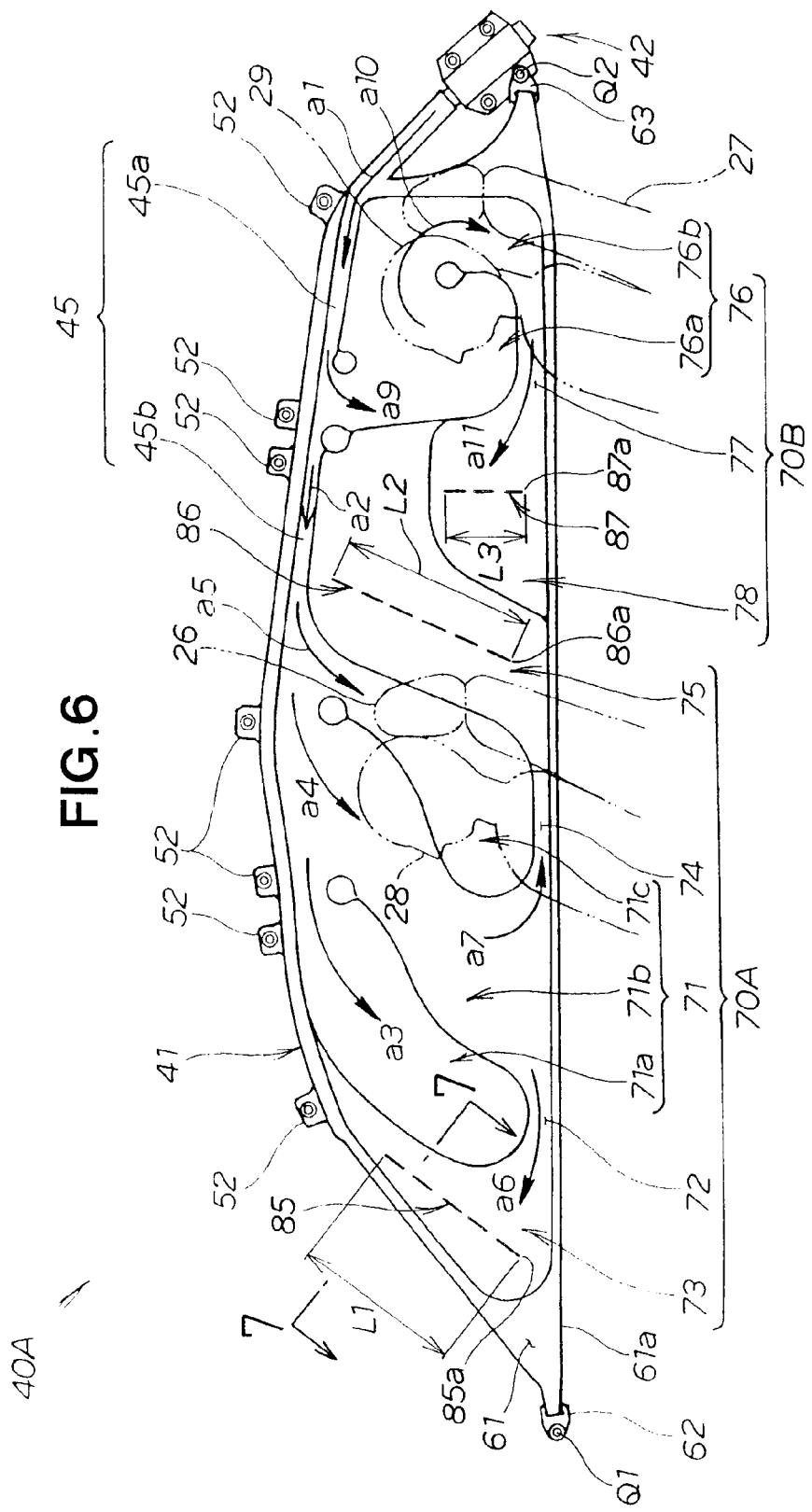
FIG. 6 is a schematic view illustrating an expanded state of a side curtain airbag of a vehicle occupant protection apparatus according to a second embodiment of the present invention.
Figure 9:
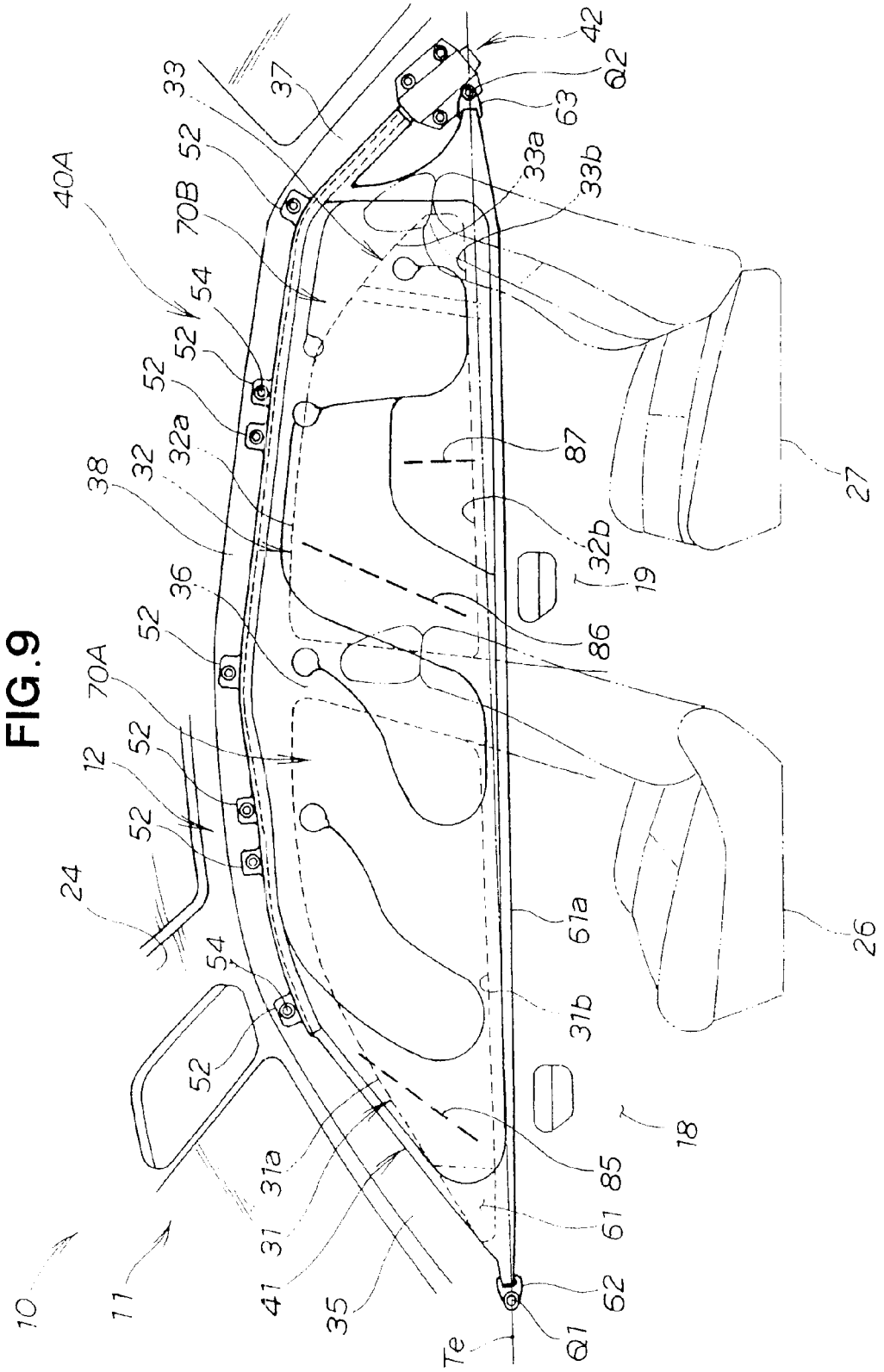
FIG. 9 is a perspective view of a vehicle cabin wherein the vehicle occupant protection apparatus of FIG. 6 has expanded.

As shown in FIGS. 6 and 9, a vehicle occupant protection apparatus 40A of the second embodiment has internal-pressure-regulating inflation parts 73, 75, 78, each of which is provided with one of three break parts 85, 86, 87. The rest of the configuration is the same as the configuration of the first embodiment. "Second break parts 85, 86, 87" will be used below as a generic term for the three break parts 85, 86, 87.

The first internal-pressure-regulating inflation part 73 is provided with the forward break part 85. The internal-pressure-regulating second inflation part 75 is provided with the central break part 86. The third internal-pressure-regulating inflation part 78 is provided with the rear break part 87.

Figure 7:
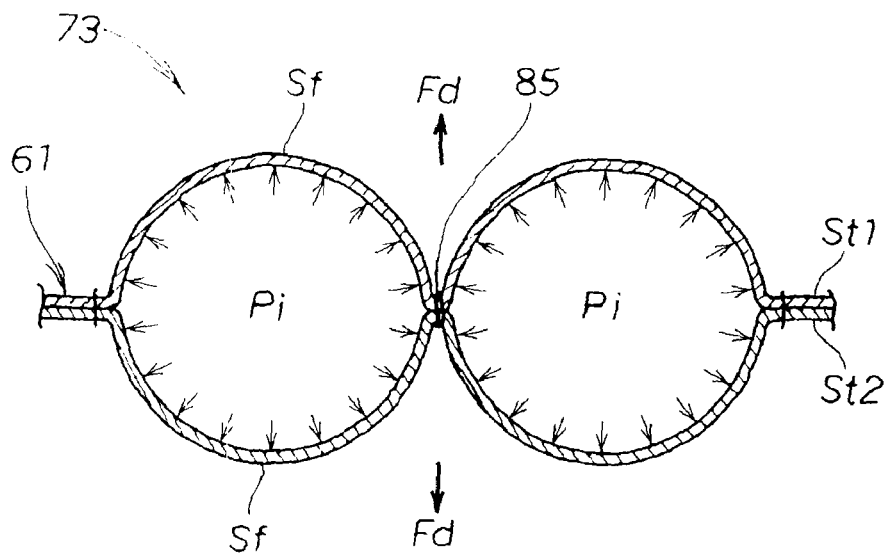
FIG. 7 is sectional view taken along line 7-7 of FIG. 6, showing a first inflation part for internal pressure regulation.

As shown in FIGS. 6 and 7, the forward break part 85 is designed to break when subjected to a specific breaking force Fd, which is produced in accordance with the internal pressure Pi of the first internal-pressure-regulating inflation part 73.

The forward break part 85 may be a component that is partially provided to the center of the first internal-pressure-regulating inflation part 73, and that can break due to the specific breaking force Fd. The forward break part 85 may be composed of components partially joined by breakable seams (tear seams), bonding, or welding, for example.

Additionally, the forward break part 85 is provided to a lateral surface Sf of the first internal-pressure-regulating inflation part 73. In other words, the forward break part 85 is provided so as to induce a break in the direction from the front to the back of the expansion part 61 (the direction in which the breaking force Fd acts, shown in FIG. 7).

Generally, as shown in FIG. 7, two sheets St1, St2 are joined by overlaying a plurality of sheets St1, St2 and then sewing together, bonding, or otherwise joining the sheets St1, St2 in the direction from the front to the back of the surface thereof when manufacturing an expansion part 61 having the first internal-pressure-regulating inflation part 73. As a result, the first internal-pressure-regulating inflation part 73 can be provided to the expansion part 61. In other words, sewing, bonding, or other such procedures are carried out in the direction from the front to the back of the surface of the expansion part 61.

Since the forward break part 85 is provided so as to induce a break in the direction from the front to the back of the surface of the expansion part 61, the forward break part 85 can be provided to the first internal-pressure-regulating inflation part 73 at the same time as the expansion part 61 is manufactured. Therefore, the first internal-pressure-regulating inflation part 73 need not have a special shape in order for the forward break part 85 to be provided to the first internal-pressure-regulating inflation part 73. Since the production efficiency of the expansion part 61 increases, the cost of the occupant protection apparatus 40A can be reduced.

Figure 8:
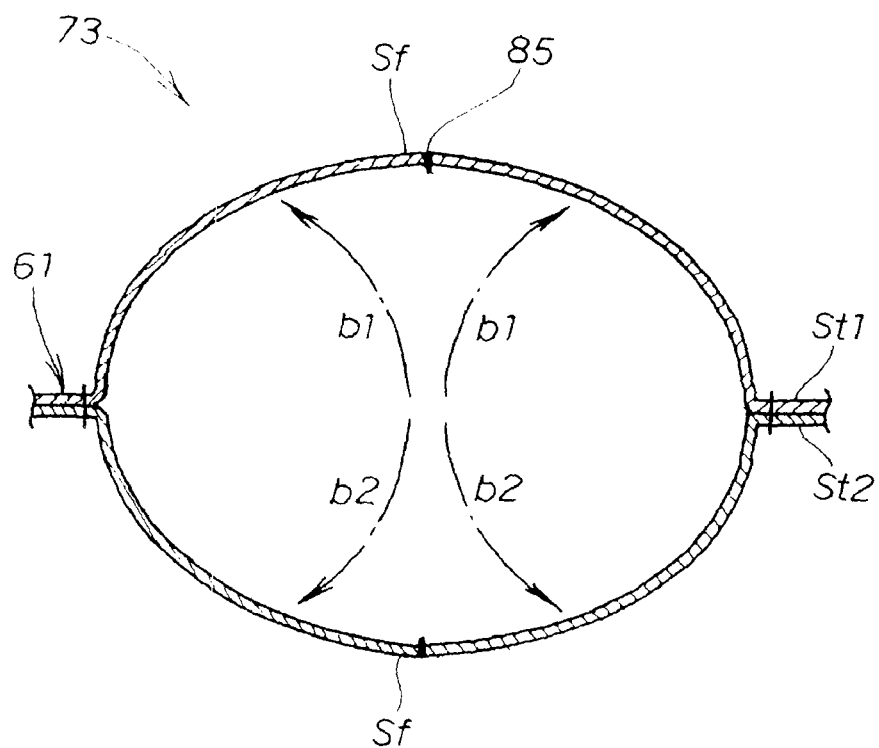
FIG. 8 is a view describing the state of a first internal-pressure-regulating inflation part after the first break part of FIG. 7 has broken.

FIG. 8 shows the state of the first internal-pressure-regulating inflation part 73 after the forward break part 85 has broken. The first internal-pressure-regulating inflation part 73 can be inflated further by the internal pressure Pi as shown by arrows b1, b1 and arrows b2, b2. The result is an increase in capacity of the first internal-pressure-regulating inflation part 73. By breaking, the forward break part 85 thus allows a further increase of the capacity of the first internal-pressure-regulating inflation part 73.

Since the central and rear break parts 86, 87 have a configuration and operation identical to the forward break part 85, a description thereof will be omitted.

As shown FIGS. 6 and 9, the forward break part 85 is formed elongated in a continuous, substantially straight line, in a broken line, or the like. Further, the forward break part 85 is set to a specific length L1.

Therefore, the time until complete breakage is induced in the forward break part 85 can be increased in accordance with the length L1 of the forward break part 85. The duration over which the internal pressure of the first occupant-protecting inflation part 71 is maintained can be further increased in accordance with the time until complete breakage occurs. As a result, the vehicle occupant 28 can be enfolded within and restrained by the first occupant-protecting inflation part 71, and the impact on the vehicle occupant 28 can be evenly absorbed.

Further, the forward break part 85 is extended facing the interior of the first internal-pressure-regulating inflation part 73, and one end 85a of the forward break part 85 faces the forward communicating channel 72.

Gas fed into the first occupant-protecting inflation part 71 flows from the first occupant-protecting inflation part 71, through the forward communicating channel 72 having a reduced diameter, and into the first internal-pressure-regulating inflation part 73. Therefore, the pressure distribution of the internal pressure of the first internal-pressure-regulating inflation part 73 tends to decrease in proportion to the increase in the size of the forward communicating channel 72 and the inward penetration of the channel.

On the other hand, since the forward break part 85 is extended facing the interior of the first internal-pressure-regulating inflation part 73, and the end 85a of the forward break part 85 faces the forward communicating channel 72, the forward break part 85 breaks sequentially from the end 85a, which faces the forward communicating channel 72, to the other end. Therefore, the timing with which the forward break part 85 begins to break can be established more accurately. Furthermore, the forward break part 85 can be reliably broken. The pressure retention time of the first occupant-protecting inflation part 71 can therefore be established more accurately.

Next, an operation of the vehicle occupant protection apparatus 40A according to the second embodiment will be described.

As shown in FIGS. 6 and 9, the forward communicating channel 72, which connects the first occupant-protecting inflation part 71 and the first internal-pressure-regulating inflation part 73, has a reduced diameter. Therefore, the flow rate of gas flowing from the first occupant-protecting inflation part 71 and into the first internal-pressure-regulating inflation part 73 is smaller than the flow rate of gas fed into the first occupant-protecting inflation part 71. When gas is fed to the first occupant-protecting inflation part 71 and the internal pressure thereof suddenly increases, the pressure necessary to protect vehicle occupants is attained. Although the first occupant-protecting inflation part 71 is in constant connection to the first internal-pressure-regulating inflation part 73, little time elapses from when the first occupant-protecting inflation part 71 begins to inflate until the internal pressure necessary to protect vehicle occupants is reached. As a result, the capability of the apparatus 40A to protect the vehicle occupants can be ensured.

The internal pressure of the first occupant-protecting inflation part 71 will then suddenly increase due to the vehicle occupant 28 coming into contact with the already inflated first occupant-protecting inflation part 71. Since the first internal-pressure-regulating inflation part 73 is connected to the first occupant-protecting inflation part 71, the internal pressure of the first internal-pressure-regulating inflation part 73 also suddenly increases. As a result, the internal pressure of the first internal-pressure-regulating inflation part 73 exceeds a specific reference pressure; therefore, the forward break part 85 breaks upon being subjected to the specific breaking force. After the forward break part 85 has broken, the capacity of the first internal-pressure-regulating inflation part 73 is further increased. As a result, the internal pressure of the first internal-pressure-regulating inflation part 73 decreases, and the internal pressure of the first occupant-protecting inflation part 71 accordingly decreases as well.

As described above, the first occupant-protecting inflation part 71 is connected to the first internal-pressure-regulating inflation part 73 from before the forward break part 85 has broken. Therefore, the difference in pressure between the internal pressure of the first occupant-protecting inflation part 71 and the internal pressure of the secondary inflation part 73 is small immediately before a break is induced in the forward break part 85. The capacity of the first internal-pressure-regulating inflation part 73 can be increased by the breakage of the forward break part 85. Even though the capacity of the first internal-pressure-regulating inflation part 73 increases, the internal pressure of the first internal-pressure-regulating inflation part 73 is kept at or above a fixed value. Therefore, the difference in pressure between the internal pressure of the first occupant-protecting inflation part 71 and the internal pressure of the first internal-pressure-regulating inflation part 73 does not become extremely large. The internal pressure of the first occupant-protecting inflation part 71 decreases relatively slowly. Therefore, the internal pressure of the first occupant-protecting inflation part 71 can be ensured for the relatively long time (pressure retention time) necessary to protect the vehicle occupant 28. The impact received by the vehicle occupant 28 can be more evenly absorbed by the first occupant-protecting inflation part 71.

The internal pressure of the first internal-pressure-regulating inflation part 73 decreases when a break is induced in the forward break part 85. The decrease can be set to an optimal value by appropriately presetting the increase in the capacity of the first internal-pressure-regulating inflation part 73.

Since the central and rear break parts 86, 87 have a configuration and operation identical to those of the forward break part 85, descriptions thereof will be omitted.

The central break part 86 is set to a specific length L2. Further, the central break part 86 is extended facing the interior of the second internal-pressure-regulating inflation part 75, with one end 86a of the central break part 86 facing the central communicating channel 74.

The rear break part 87 is set to a specific length L3. Further, the rear break part 87 is extended facing the interior of the third internal-pressure-regulating inflation part 78, with one end 87a of the rear break part 87 facing the rear communicating channel 77.

FIG. 10 is a graph of the pressure characteristics of the occupant-protecting inflation part and the first internal-pressure-regulating inflation part according to the second embodiment. FIG. 10 shows the pressure characteristics of each inflation part, with time being shown on the horizontal axis and the pressure Pin of the inflation parts being shown on the vertical axis. The pressure characteristics will be described below with reference to FIG. 9.

A curve Em, indicated by a solid line, is a characteristic curve of the pressure of the first occupant-protecting inflation part 71 in the airbag 41 according to the present embodiment. A curve Es, indicated by a dotted line, is a characteristic curve of the pressure of the first internal-pressure-regulating inflation part 73 in the airbag 41 according to the present embodiment. A curve Cm, indicated by an alternatingly dotted line, is a characteristic curve of the pressure of an occupant-protecting inflation part in an airbag of a comparative example (not shown).

In the airbag of the comparative example, a first break part, which can be broken by the internal pressure of the occupant-protecting inflation part, forms a partition between the occupant-protecting inflation part and the internal-pressure-regulating inflation part. In the airbag of the comparative example, the break part breaks when the internal pressure of the occupant-protecting inflation part exceeds a reference pressure.

In the present embodiment, the slow decrease in the internal pressure Pin for the duration of a pressure retention time Ti, which extends from the time t1, when the internal pressure Pin of the first occupant-protecting inflation part 71 exceeds a specific reference pressure Ps, to the time t2, can be determined from the characteristic curve Em of the pressure of the occupant-protecting inflation part. As a result, the internal pressure Pin can be maintained at or above a specific pressure Pm for the duration of the pressure retention time Ti.

In this instance, the reference pressure Ps is the pressure of the first occupant-protecting inflation part 71 when the forward break part 85 of the first internal-pressure-regulating inflation part 73 begins to break. The specific pressure Pm is the internal pressure of the first inflation part 71 needed to protect the vehicle occupant 28. The pressure retention time Ti is the specific period of time for which the specific pressure Pm must be maintained in order to protect the vehicle occupant 28.

Additionally, in the present embodiment, the fact that the internal pressure Pin of the first internal-pressure-regulating inflation part 73 gradually increases from the time when the first occupant-protecting inflation part 71 starts to inflate can be determined from the characteristic curve Es of the pressure of the first internal-pressure-regulating inflation part.

The fact that the internal pressure Pin suddenly decreases due to the breakage of the break part at the time t1, at which time the internal pressure Pin of the occupant-protecting inflation part exceeds the reference pressure, can be determined from the characteristic curve Cm of the pressure of the occupant-protecting inflation part in the comparative example. As a result, the internal pressure Pin cannot be maintained at or above the specific pressure Pin for the duration of the pressure retention time Ti.

Next, a first modification of the first internal-pressure-regulating inflation part according to the second embodiment will be described based on FIGS. 11A and 11B.

As shown in FIG. 11A, the configuration of a forward break part is modified in a first internal-pressure-regulating inflation part 93 in an expansion part 91 according to the first modification. In other words, the forward break part 95 of the first modification has been modified from the configuration of the forward break part 85 shown in the above-mentioned FIG. 7.

The expansion part 91 is composed of two mutually overlaid and joined sheets 96, 97. Of the two sheets 96, 97, the sheet 96, which is on the side that faces the window 31 when expanded, is referred to as the front surface member 96, and the sheet 97 on the other side (the side of the vehicle cabin 12) is referred to as the reverse surface member 97. It shall be apparent that the first internal-pressure-regulating inflation part 93 is composed of the front surface member 96 and the reverse surface member 97.

The reverse surface member 97 has a folded-back portion 97a that is folded back toward the vehicle cabin 12. The folded-back portion 97a is provided to the center of the reverse surface member 97. Fold-base ends 97b, 97b of the folded-back portion 97a are joined by partially joined forward break parts 94, 95. The configuration of the forward break parts 94, 95 is identical to the configuration of the forward break part 85 shown in the above-mentioned FIG. 7.

The forward break parts 94, 95 break upon being subjected to a specific breaking force Fd produced in accordance with an internal pressure Pi of the first internal-pressure-regulating inflation part 93. As a result, the gas within the first internal-pressure-regulating inflation part 93 flows as shown by an arrow c1.

FIG. 11B shows the state of the first internal-pressure-regulating inflation part 93 after the forward break parts 94, 95 have broken. The first internal-pressure-regulating inflation part 93 can be inflated further by the internal pressure Pi. As a result, the capacity of the first internal-pressure-regulating inflation part 93 increases. By breaking, the forward break parts 94, 95 thus allow a further increase in the capacity of the first internal-pressure-regulating inflation part 93.

When the forward break parts 94, 95 have broken, the first internal-pressure-regulating inflation part 93 inflates towards the side opposite the window 31 due to the extended length of the reverse surface member 97. Therefore, after the forward break parts 94, 95 have broken, the first internal-pressure-regulating inflation part 93 can be prevented from making forceful contact with the window 31. Additionally, the first internal-pressure-regulating inflation part 93 can inflate in a location set apart from the sitting location 26 of the vehicle occupant 28 (see FIG. 6), as in the second embodiment. Therefore, even when the first internal-pressure-regulating inflation part 93 inflates further, contact with the vehicle occupant 28 will not occur.

Since the central and rear break parts 86, 87 (see FIG. 6) have a configuration and operation identical to the first break part 95, a description thereof will be omitted.

Next, a second modification of the first internal-pressure-regulating inflation part according to the second embodiment will be described based on FIGS. 12A and 12B.

Figure 12A:
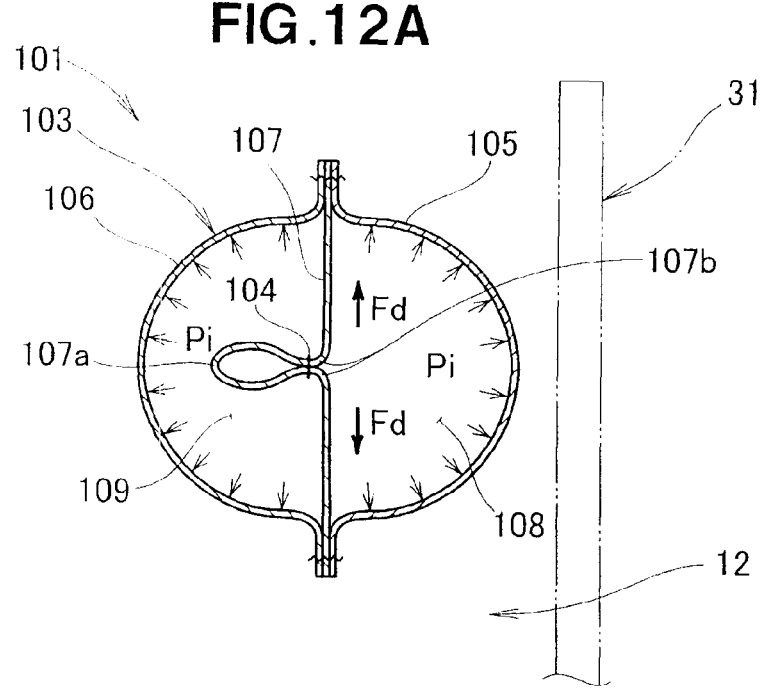
FIGS. 12A and 12B illustrate a second modification of the first internal-pressure-regulating inflation part according to the second embodiment of the present invention.

As shown in FIG. 12A, the configuration of a forward break part is modified in a first internal-pressure-regulating inflation part 103 in an expansion part 101 according to the second modification. In other words, the forward break part 104 of the second modification has been modified from the configuration of the forward break part 85 shown in the above-mentioned FIG. 7.

The expansion part 101 is composed of two mutually overlaid and joined sheets 105, 106. Of the two sheets 105, 106, the sheet 105, which is on the side that faces the window 31 when expanded, is referred to as the front surface member 105, and the sheet 106 on the other side (the side of the vehicle cabin 12) is referred to as the reverse surface member 106. It shall be apparent that the first internal-pressure-regulating inflation part 103 is composed of the front surface member 105 and the reverse surface member 106.

The center part of the first internal-pressure-regulating inflation part 103 is divided into a right chamber 108 and a left chamber 109 by a sheet-form restricting member 107. The right chamber 108 and the left chamber 109 are connected together. The right chamber 108 and the left chamber 109 can be connected, e.g., through one of the following two configurations. In a first configuration, the restricting member 107 is configured with connecting holes. In a second configuration, the restricting member 107 does not penetrate as far into the first internal-pressure-regulating inflation part 103 (the dimension of the direction from the front to the back of the page in FIG. 12A).

The restricting member 107 restricts the inflation of the first internal-pressure-regulating inflation part 103 by being interposed between the front surface member 105 and the reverse surface member 106. The restricting member 107 has a folded-back portion 107a identical to the folded-back portion 97a shown in the above-mentioned FIG. 11A. The foldbase ends 107b, 107b of the folded-back portion 107a are joined by the partially joined forward break part 104. The configuration of the forward break part 104 is identical to the configuration of the forward break parts 94, 95 shown in the above-mentioned FIG. 1A.

The forward break part 104 breaks on being subjected to a specific breaking force Fd produced in accordance with the internal pressure Pi of the first internal-pressure-regulating inflation part 103. When the forward break part 104 has broken, the length of the restricting member 107 increases and the first internal-pressure-regulating inflation part 103 accordingly inflates.

Figure 12B:
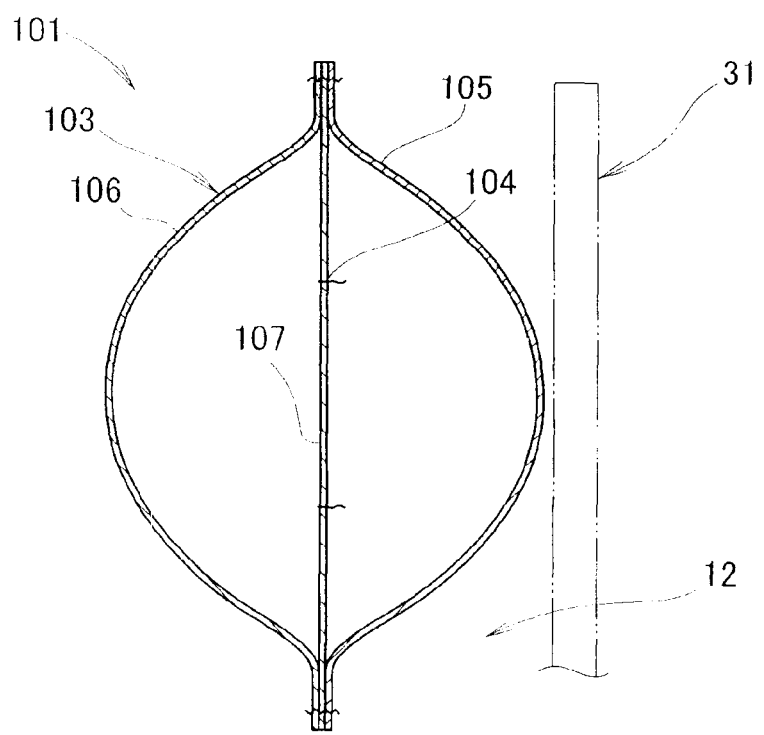

FIG. 12B shows the state of the first internal-pressure-regulating inflation part 103 after the forward break part 104 has broken. The first internal-pressure-regulating inflation part 103 can be inflated further by the internal pressure Pi. As a result, the capacity of the first internal-pressure-regulating inflation part 103 increases. The breaking of the forward break part 104 allows a further increase in the capacity of the first internal-pressure-regulating inflation part 103.

In the second modification, the forward break part 104 is positioned within the first inflation part 103. Therefore, the gas within the first inflation part 103 does not leak out, despite the forward break part 104 being in the first inflation part 103. Additionally, the forward break part 104 does not protrude to the outside of the expansion part 101; therefore, the appearance of the expansion part 101 is improved. Furthermore, the expansion part 101 will be pleasing to the touch for the vehicle occupants.

Since the central and rear break parts 86, 87 (see FIG. 6) have a configuration and operation identical to the first break part 104, a description thereof will be omitted.

Next, a vehicle occupant protection apparatus according to a third embodiment will be described based on FIGS. 13 through 15. Where the operation and configuration of the third embodiment are identical to the second embodiment shown in the above-mentioned FIGS. 6 through 10, the same notation is used and the associated description is omitted. Additionally, the configuration of the third embodiment is also identical to the configuration shown in the above-mentioned FIGS. 1 and 2, which will be referenced as such. The contents of FIG. 13 correspond to the above-mentioned FIG. 6. The contents of FIG. 14 correspond to the above-mentioned FIG. 91. FIG. 15 is a schematic view showing the expanded state of the side curtain airbag shown in FIG. 13.

Figure 14:
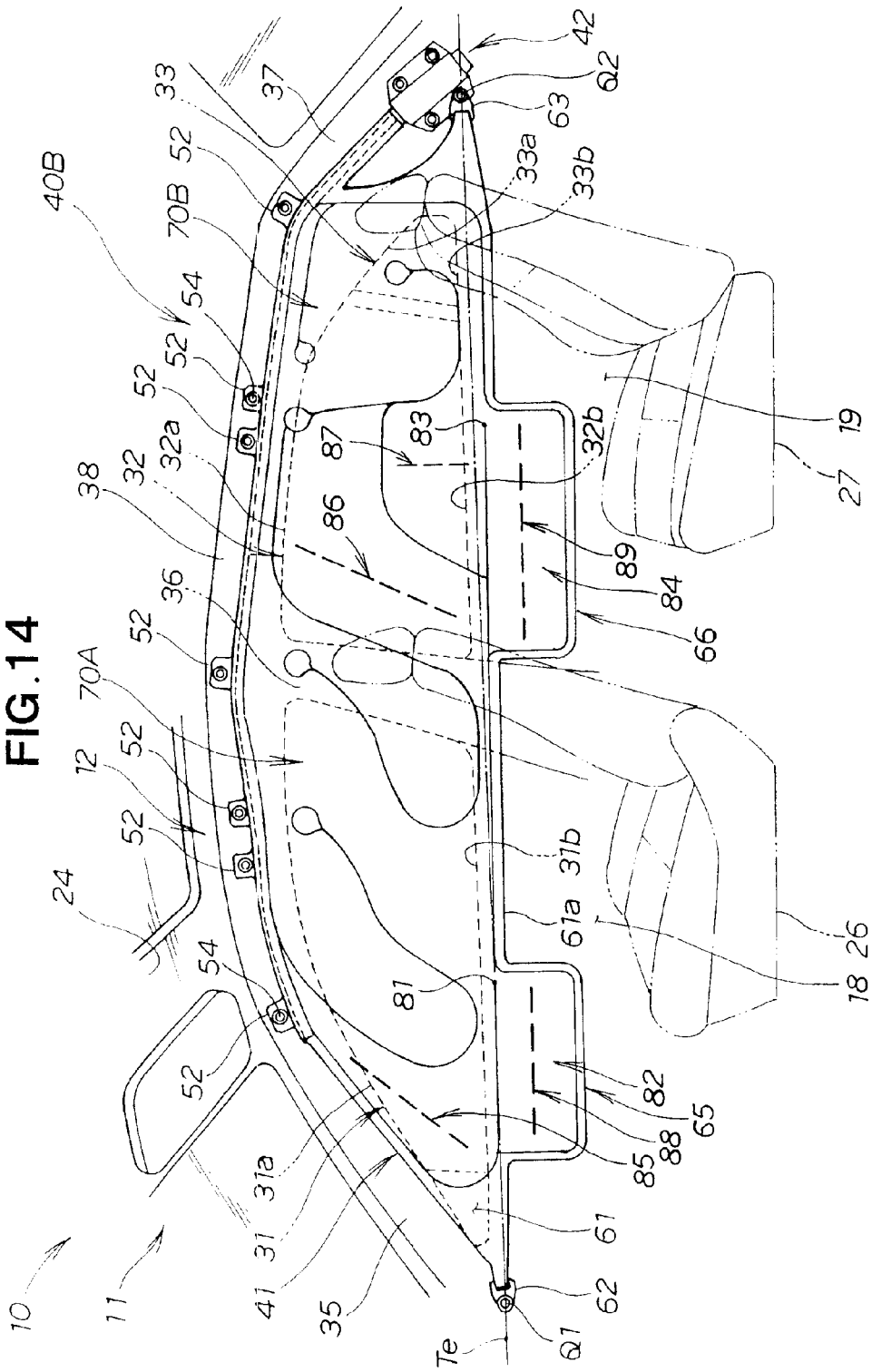
FIG. 14 is a perspective view of a vehicle cabin wherein the vehicle occupant protection apparatus shown in FIG. 13 has expanded.
Figure 15:
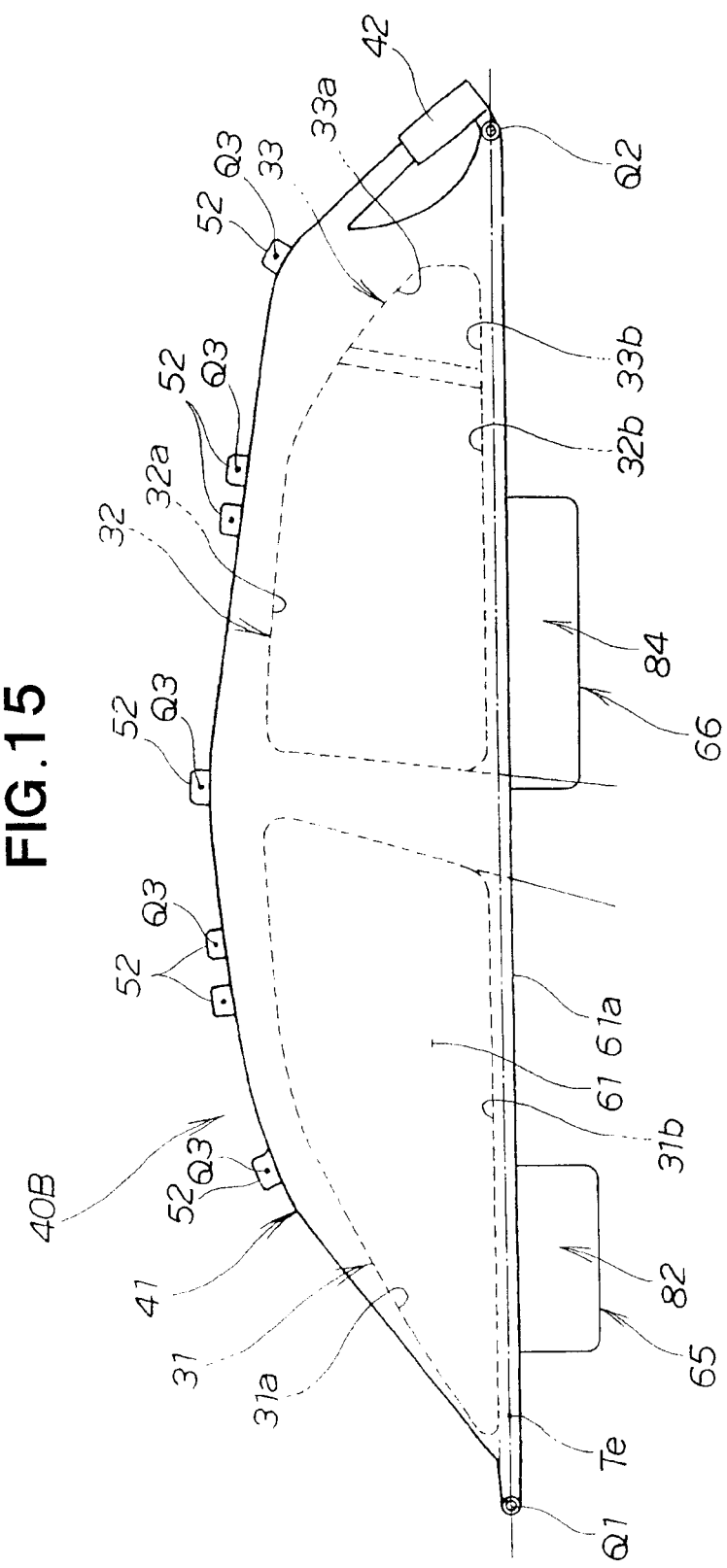
FIG. 15 is a schematic view showing the expanded state of the side curtain airbag shown in FIG. 13.

As shown in FIGS. 13 through 15, an expansion part 61 of a vehicle occupant protection apparatus 40B according to the third embodiment is provided with two supplementary secondary expansion parts 65, 66 for expanding below the windows 31, 32, 33. The configuration is otherwise the same as in the second embodiment.

The first secondary expansion part 65 and the second secondary expansion part 66 expand below the tension line Te. Therefore, when the expansion part 61 is expanded, the secondary expansion parts 65, 66 are supported by the parts of the vehicle body 11 (including the doors provided with the windows 31, 32, 33) that are below the lower edges 31b, 32b, 33b of the windows 31, 32, 33. In other words, since the lower portion of the expansion part 61 is supported by the vehicle body 11 via the secondary expansion parts 65, 66, the expansion part 61 has high rigidity. An expansion part 61 with high rigidity does not easily slacken from the side of the vehicle cabin 12 outward, and the entirety thereof therefore exhibits an ability to provide substantially uniform protection for the vehicle occupants. The ability of the vehicle occupant protection apparatus 40B to protect the vehicle occupants can thereby be increased using a simple configuration wherein the supplementary secondary expansion parts 65, 66 are merely provided to the expansion part 61. The vehicle occupant protection apparatus 40B can be made lighter and less expensive merely by being provided with the secondary expansion parts 65, 66.

Further, the first and second secondary expansion parts 65, 66 are positioned elsewhere besides locations facing the sitting locations 26, 27 of the vehicle occupants 28, 29. Specifically, the first secondary expansion part 65 is positioned below the first internal-pressure-regulating inflation part 73 and below the forward chamber 71a. The second secondary expansion part 66 is positioned below the second and third internal-pressure-regulating inflation parts 75, 78.

More specifically, the first secondary expansion part 65 is positioned between the instrument panel 25 (FIG. 1) and the occupant 28 seated in the front seat 26, whilst the second secondary expansion part 66 is positioned between the front seat 26 and the upper body half of the occupant 29 seated in the back seat 27.

Therefore, when the expansion part 61 expands, the secondary expansion parts 65, 66 need not enter the space between the vehicle occupants 28, 29 and the windows 31, 32, 33. The expansion part 61 and the secondary expansion parts 65, 66 expand in a straightforward manner. As a result, the ability of the vehicle occupant protection apparatus 40B to protect the vehicle occupants can be further increased.

The two forward and rear expansion parts 65, 66 are provided with two secondary inflation parts 82, 84 that are inflated by gas pressure. In other words, the first secondary expansion part 65 is provided with the first secondary inflation part 82. The second secondary expansion part 66 has the second secondary expansion part 84.

Since the secondary expansion parts 65, 66 are provided with the secondary inflation parts 82, 84, the rigidity of the secondary expansion parts 65, 66 is enhanced by the inflation of the secondary inflation parts 82, 84 due to gas pressure. The lower portion of the expansion part 61 is more adequately supported by the vehicle body 11 due to the highly rigid secondary expansion parts 65, 66. The rigidity of the expansion part 61 is further increased.

As described above, the secondary expansion parts 65, 66 are positioned only in locations that do not face the sitting locations 26, 27 of the vehicle occupants 28, 29. Therefore, the secondary inflation parts 82, 84 are also positioned only in locations that do not face the sitting locations 26, 27 of the vehicle occupants 28, 29. The secondary inflation parts 82, 84 do not enter the space between the lateral surface of the vehicle cabin 12 and the vehicle occupants 28, 29. Therefore, the secondary inflation parts 82, 84 can be inflated very rapidly without increasing the flow rate of gas fed to the secondary inflation parts 82, 84. The inflator 42 may accordingly be small. As a result, a lighter, less expensive vehicle occupant protection apparatus 40B can be achieved.

The first secondary inflation part 82 is in constant connection solely to the first occupant-protecting inflation part 71 (primary inflation part 70A) via a lower-forward communicating channel 81. The lower-forward communicating channel 81 (reduced-diameter part 81) connects the central chamber 71b and the first secondary inflation part 82.

The second secondary inflation part 84 is in constant connection solely to the second occupant-protecting inflation part 76 (primary inflation part 70B) via a lower-rear communicating channel 83. The lower-rear communicating channel 83 (reduced-diameter part 83) connects the rear chamber 76b and the second secondary inflation part 84 via the rear communicating channel 77.

The lower-forward communicating channel 81 and the lower-rear communicating channel 83 have reduced diameters (i.e., are provided with relatively small diameters) in order to limit the flow rate of gas. "First communicating channels 81, 83" will be used below as a generic term for the two communicating channels 81, 83.

The first secondary inflation part 82 has an added function of adjusting the internal pressure of the first occupant-protecting inflation part 71, as with the first and second internal-pressure-regulating inflation parts 73, 75. The second secondary inflation part 84 has an added function of adjusting the internal pressure of the second occupant-protecting inflation part 76, as with the third internal-pressure-regulating inflation part 78.

The first secondary inflation part 82 is provided with a lower-forward break part 88. The second secondary inflation part 84 is provided with a lower-rear break part 89. "First break parts 88, 89" will be used below as a generic term for the two break parts 88, 89. The first break parts 88, 89 are designed to break when subjected to a specific breaking force produced in accordance with the internal pressure of the secondary inflation parts 82, 84. The breaking of the first break parts 88, 89 allows the capacity of the secondary inflation parts 82, 84 to be further increased. The first break parts 88, 89 have a configuration identical to the forward break part 85 shown in the above-mentioned FIGS. 6 through 8, and a description thereof will be omitted.

The first communicating channels 81, 83, which connect the occupant-protecting inflation parts 71, 76 and the secondary inflation parts 82, 84, have reduced diameters. Therefore, the flow rate of gas flowing from the occupant-protecting inflation parts 71, 76 and into the secondary inflation parts 82, 84, as shown by arrows a8, a12 in FIG. 13, is smaller than the flow rate of gas fed into the occupant-protecting inflation parts 71, 76. When gas is fed to the occupant-protecting inflation parts 71, 76 and the internal pressure thereof suddenly increases, the pressure necessary to protect vehicle occupants is attained. Although the occupant-protecting inflation parts 71, 76 are constantly connected to the secondary inflation parts 82, 84, little time elapses from when the occupant-protecting inflation parts 71, 76 begin to inflate until the internal pressure necessary to protect vehicle occupants is reached. As a result, the ability of the vehicle occupant protection apparatus 40B to protect the vehicle occupants can be ensured.

The internal pressure of the occupant-protecting inflation parts 71, 76 will then suddenly increase due to the vehicle occupants 28, 29 coming into contact with the inflated occupant-protecting inflation parts 71, 76. Since the secondary inflation parts 82, 84 are connected to the occupant-protecting inflation parts 71, 76, the internal pressure of the secondary inflation parts 82, 84 also suddenly increases. As a result, the first break parts 88, 89 break on being subjected to the specific breaking force due to the internal pressure of the secondary inflation parts 82, 84 exceeding a specific reference pressure. After the first break parts 88, 89 have broken, the capacity of the secondary inflation parts 82, 84 is further increased. As a result, the internal pressure of the secondary inflation parts 82, 84 decreases, and the internal pressure of the occupant-protecting inflation parts 71, 76 accordingly decreases as well.

As described above, the first occupant-protecting inflation parts 71, 76 are connected to the secondary inflation parts 82, 84 from before the first break parts 88, 89 have broken. Therefore, the difference in pressure between the internal pressure of the occupant-protecting inflation parts 71, 76 and the internal pressure of the secondary inflation parts 82, 84 is small immediately before a break is induced in the first break parts 88, 89. The capacity of the secondary inflation parts 82, 84 can be increased by the breaking of the first break parts 88, 89. Even though the capacity of the secondary inflation parts 82, 84 increases, the internal pressure of the secondary inflation parts 82, 84 is kept at or above a fixed value. Therefore, the difference in pressure between the internal pressure of the occupant-protecting inflation parts 71, 76 and the internal pressure of the secondary inflation parts 82, 84 does not become extremely large. The internal pressure of the occupant-protecting inflation parts 71, 76 decreases relatively slowly. Therefore, the internal pressure of the occupant-protecting inflation parts 71, 76 can be ensured for the relatively long time (pressure retention time) necessary to protect the vehicle occupants 28, 29. The impact received by the vehicle occupants 28, 29 can be more evenly absorbed by the occupant-protecting inflation parts 71, 76.

The internal pressure of the secondary inflation parts 82, 84 decreases when a break is induced in the first break parts 88, 89. The decrease can be set to an optimal value by appropriately presetting the increase in the capacity of the secondary inflation parts 82, 84.

The lower-forward break part 88 is set to a specific length L4. The lower-rear break part 89 is set to a specific length L5.

The time until complete breakage can be induced in the first break parts 88, 89 can therefore be increased in accordance with the length of the first break parts 88, 89. The duration over which the internal pressure of the occupant-protecting inflation parts 71, 76 is maintained can be further increased in accordance with the time until complete breakage occurs. As a result, the vehicle occupants 28, 29 can be enfolded within and restrained by the occupant-protecting inflation parts 71, 76, and the impact on the vehicle occupants 28, 29 can be evenly absorbed.

Further, the lower-forward break part 88 is extended facing the interior of the first secondary inflation part 82, and one end 88a of the lower-forward break part 88 faces the lower-forward communicating channel 81. The lower-rear break part 89 is extended facing the interior of the second secondary inflation part 84, and one end 89a of the lower-rear break part 89 faces the lower-rear communicating channel 83.

Gas fed into the first occupant-protecting inflation part 71 flows out through the lower-forward communicating channel 81 having a reduced diameter, and into the first secondary inflation part 82 from the first inflation part 71. Therefore, the pressure distribution of the internal pressure of the first secondary inflation part 82 tends to decrease in proportion to the size of the lower-forward communicating channel 81 and the inward penetration of the channel.

On the other hand, since the lower-forward break part 88 is extended facing the interior of the first secondary inflation part 82, and the end 88a of the lower-forward break part 88 faces the lower-forward communicating channel 81, the lower-forward break part 88 breaks sequentially from the end 88a, which faces the lower-forward communicating channel 81, to the other end. Therefore, the timing with which the lower-forward break part 88 begins to break can be established more accurately. Furthermore, the lower-forward break part 88 can be reliably broken. Therefore, the pressure retention time of the first occupant-protecting inflation part 71 can be established more accurately. Since the operation of the lower-rear break part 89 is also identical to the lower-forward break part 88, a description thereof will be omitted.

Figure 16A:
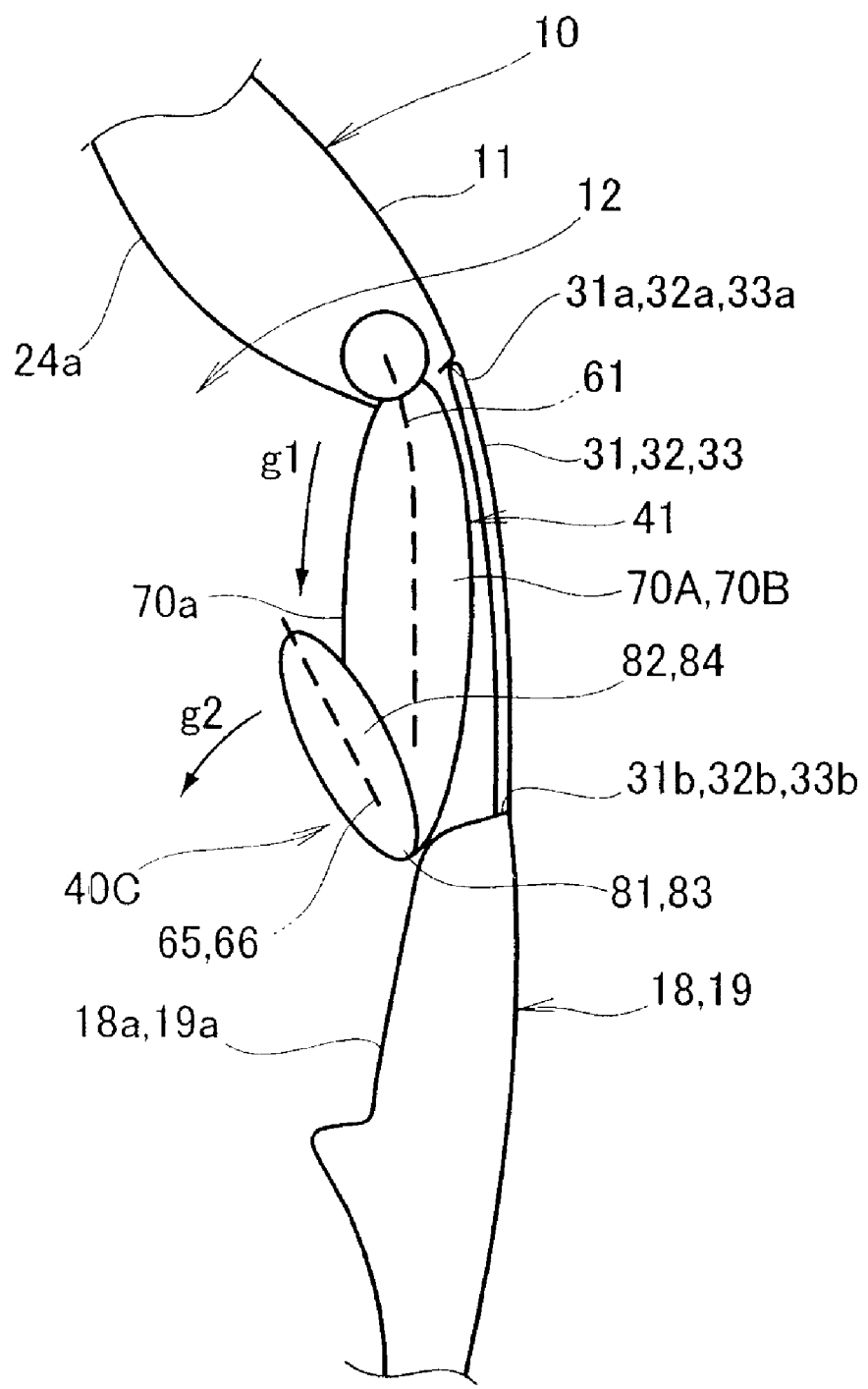
FIGS. 16A and 16B are schematic views of a first alternation of the vehicle occupant protection apparatus according to the third embodiment of the present invention.
Figure 16B:
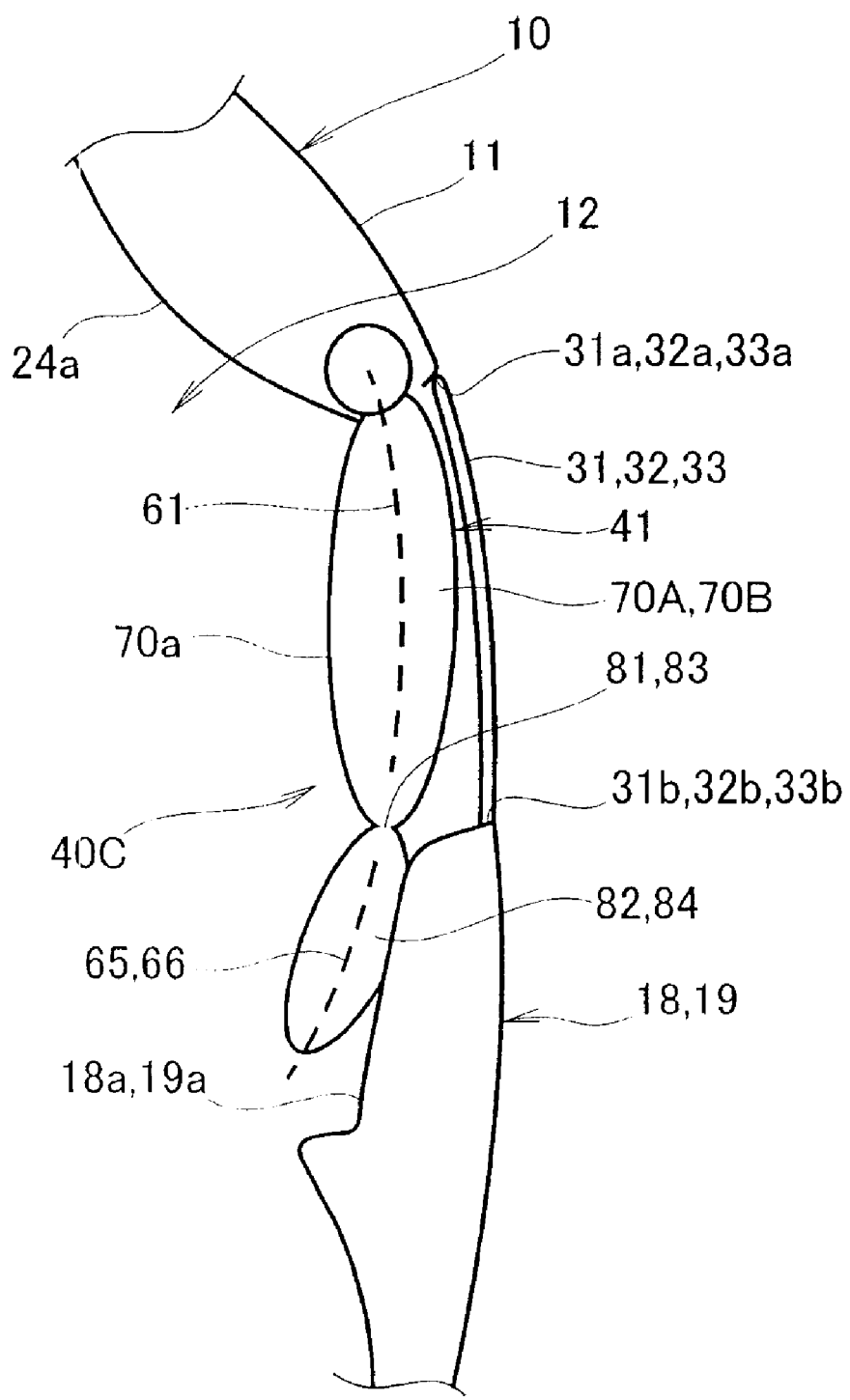
Figure 17:
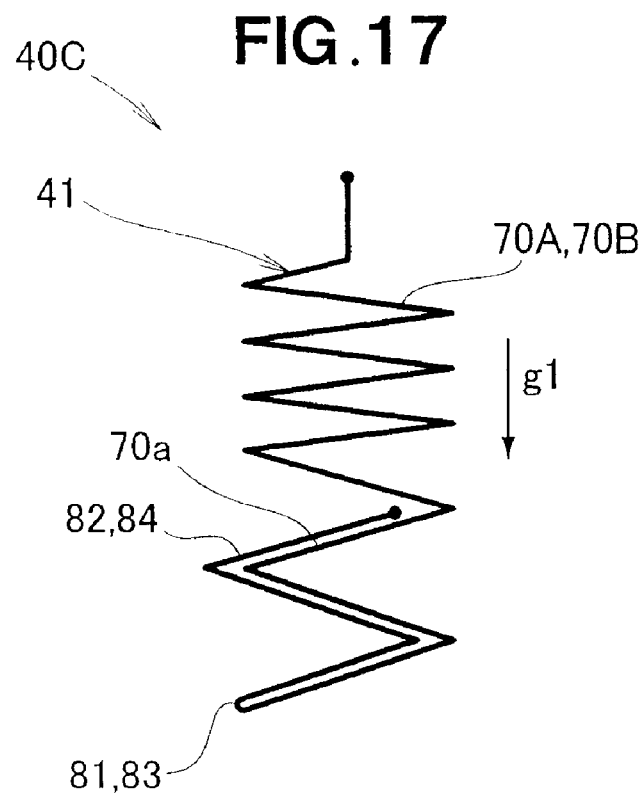
FIG. 17 is a schematic view of the side curtain airbag shown in FIG. 16A.

Next, a first modification of the vehicle occupant protection apparatus according to the third embodiment will be described based on FIGS. 16A, 16B, and 17. FIGS. 16A and 16B schematically show the cross-sectional structure of the principal components of the vehicle 10 viewed from the rear. FIG. 17 schematically shows a vehicle occupant protection apparatus 40C viewed from the rear as in FIG. 16A.

As shown in FIGS. 16A and 17, the vehicle occupant protection apparatus 40C of the first modification has the secondary inflation parts 82, 84 positioned on the stored side curtain airbag 41. The configuration is otherwise the same as the configuration of the third embodiment shown in the above-mentioned FIGS. 13 through 15.

The secondary inflation parts 82, 84 are stored in a folded state on a surface 70a of the primary inflation parts 70A, 70B on the side of the vehicle cabin 12. The communication channels 81, 83 are located at the folding points of the secondary inflation parts 82, 84 relative to the primary inflation parts 70A, 70B.

The action by which the airbag 41 expands is as follows. As shown in FIGS. 16A and 17, first, the stored airbag 41 expands while the primary inflation parts 70A, 70B inflate downward as shown by an arrow g1. Then, the secondary inflation parts 82, 84 expand and inflate into the vehicle cabin 12 as shown by an arrow g2. As a result, the airbag 41 assumes the expanded state shown in FIG. 16B. As shown in FIG. 16B, the primary inflation parts 70A, 70B can cover the entirety of the windows 31, 32, 33 by expanding to the lower edges 31b, 32b, 33b of the windows 31, 32, 33 of the vehicle 10.

The secondary inflation parts 82, 84 are thus stored in a folded state on the surface of the primary inflation parts 70A, 70B on the side of the vehicle cabin 12. Therefore, the expandability of the secondary inflation parts 82, 84 can be further increased regardless of whether the vehicle body 11 (including the doors 18, 19) deforms when the side of the vehicle 10 is subjected to an external impact force.

The secondary inflation parts 82, 84 expand after the primary inflation parts 70A, 70B have expanded, thereby allowing the load on the inner surfaces 18a, 19a (the door linings 18a, 19a) of the doors 18, 19 to be alleviated when the secondary inflation parts 82, 84 expand.

Next, a second modification of the vehicle occupant protection apparatus according to the third embodiment will be described based on FIG. 18.

Figure 18:
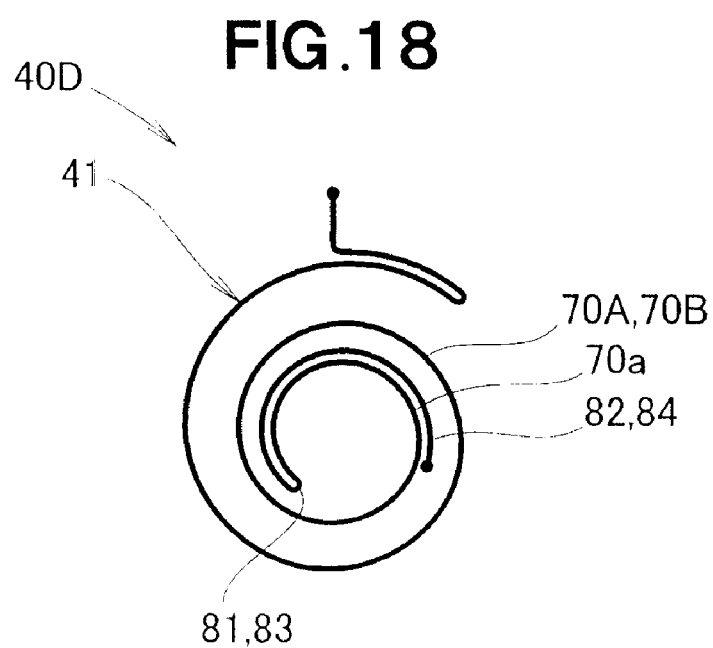
FIG. 18 is a schematic view of a second modification of the side curtain airbag according to the third embodiment of the present invention.

As shown in FIG. 18, a vehicle occupant protection apparatus 40D according to the second modification has a specific structure for storing the side curtain airbag 41, and the structure is modified from the structure for storing the airbag 41 shown in the above-mentioned FIG. 17.

Specifically, in the airbag 41 of the second modification, the secondary inflation parts 82, 84 are folded onto the surface 70a of the primary inflation parts 70A, 70B on the side of the vehicle cabin, as in the first modification shown in FIGS. 16A and 17. In the second modification, once the secondary inflation parts 82, 84 have been folded onto the primary inflation parts 70A, 70B, the primary inflation parts 70A, 70B are rolled up together with the secondary inflation parts 82, 84 in the clockwise direction as shown in FIG. 18. According to the second modification, creases tend not to form in the airbag 41, and expandability is therefore increased.

Next, a third modification of the vehicle occupant protection apparatus according to the third embodiment will be described based on FIG. 19.

Figure 19:
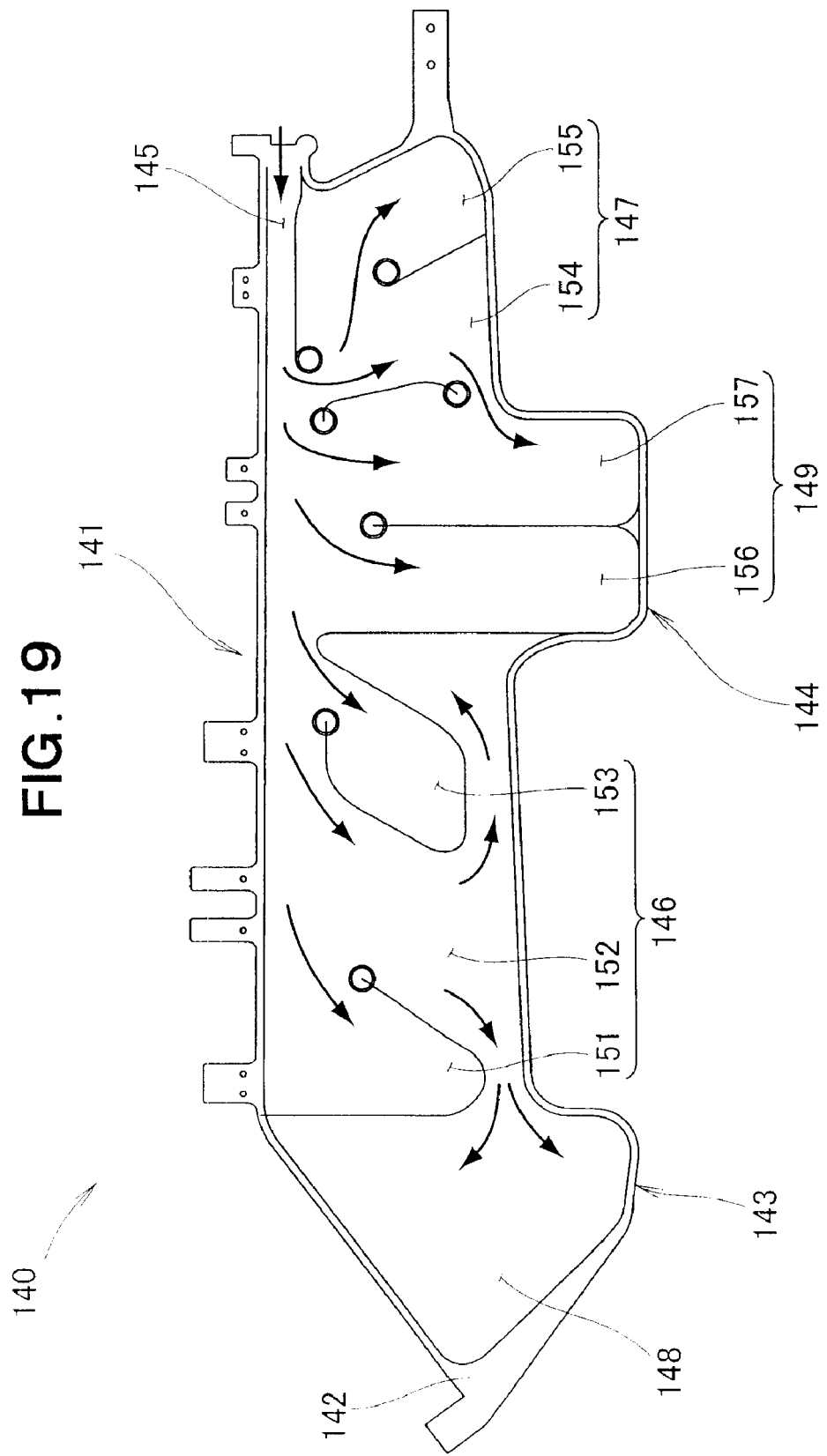
FIG. 19 is a view showing the expanded state of an modification of the side curtain airbag according to the third embodiment of the present invention.
Figure 20:
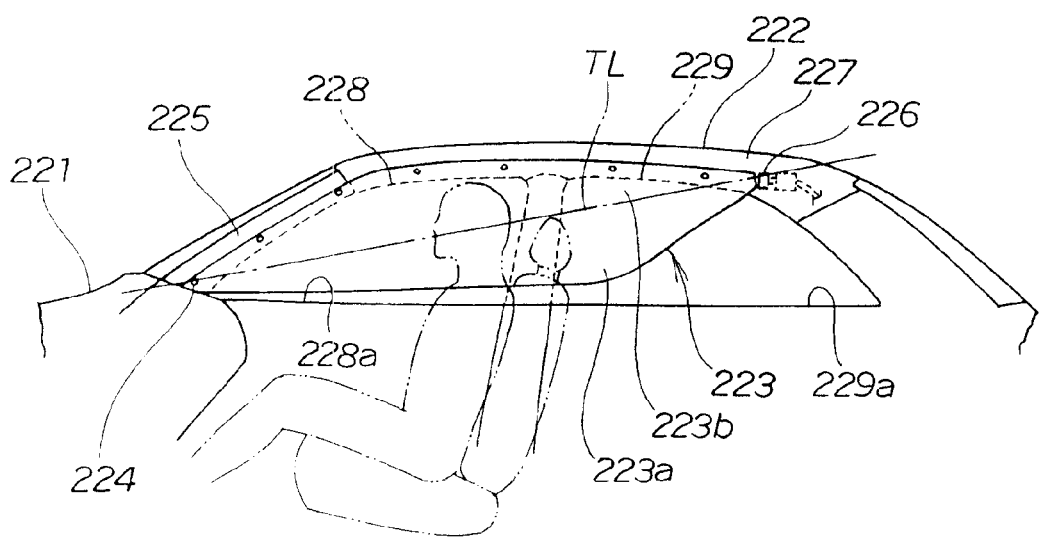
FIG. 20 is a schematic view illustrating a first conventional vehicle occupant protection apparatus.
Figure 21:
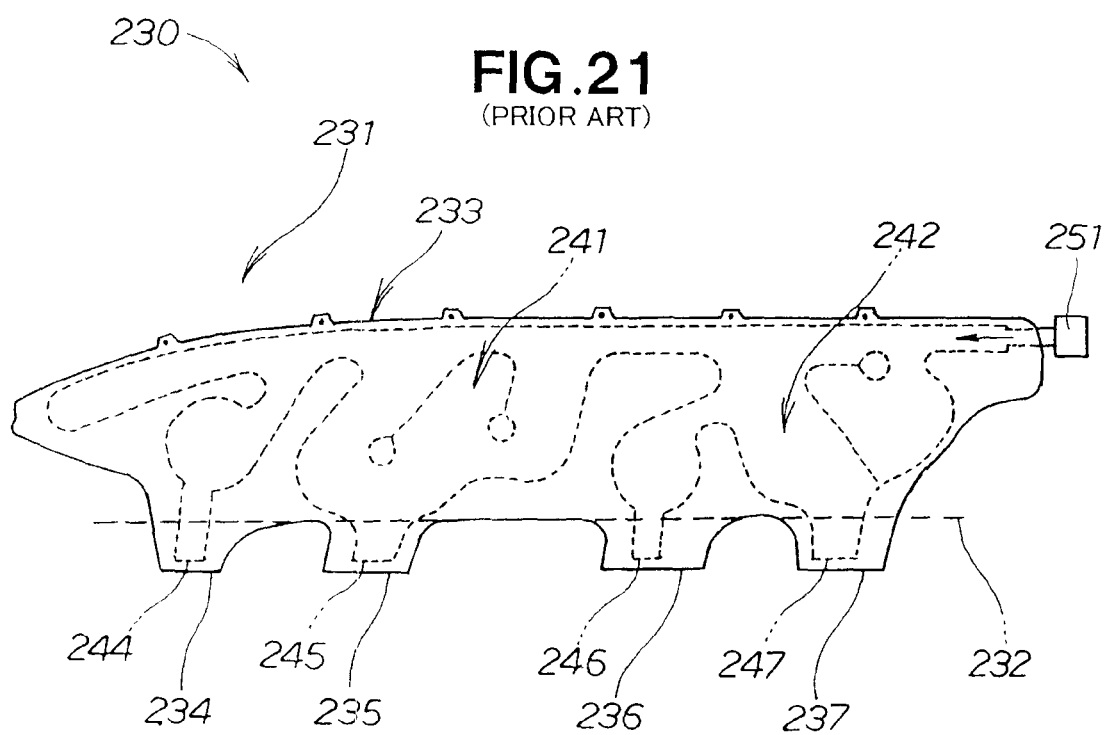
FIG. 21 is a schematic view illustrating a second conventional vehicle occupant protection apparatus.
Figure 22:
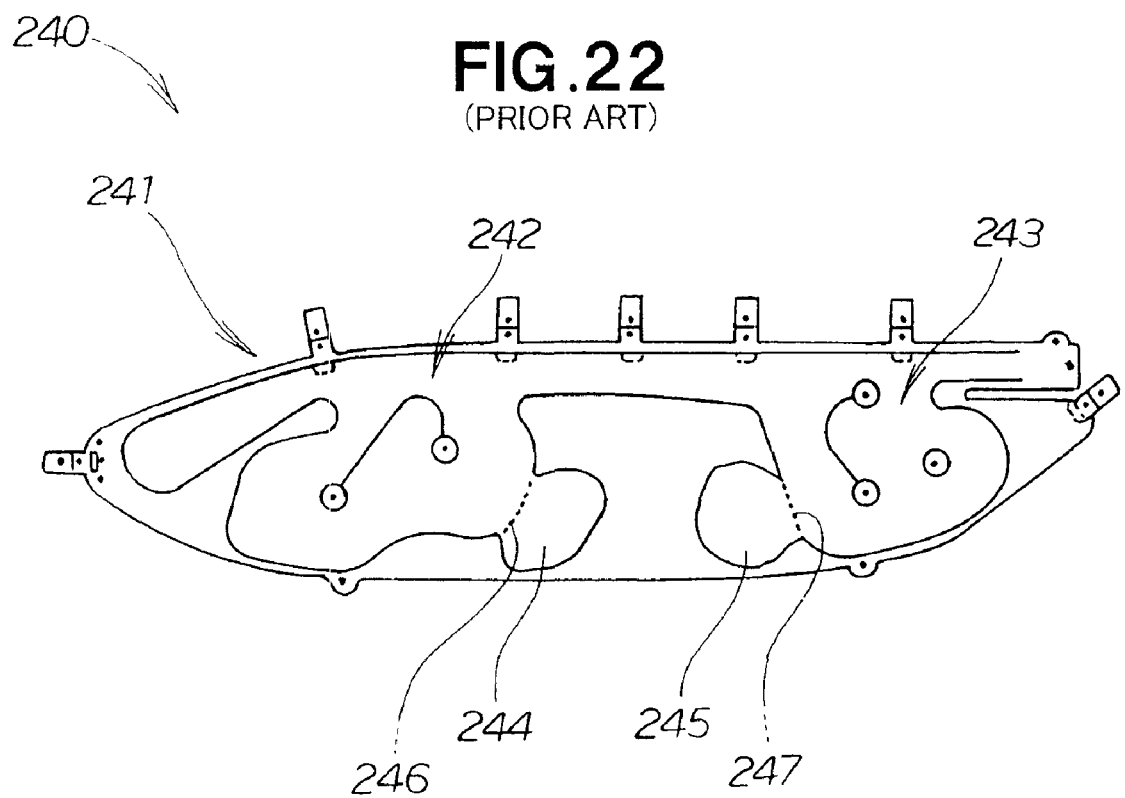
FIG. 22 is a schematic view illustrating a third conventional vehicle occupant protection apparatus.

FIG. 19 shows a side airbag 141 in an expanded state. In the vehicle occupant protection apparatus 140 of the third modification, the airbag 141 has an expansion part 142. The airbag 141 is composed of a gas introduction part 145 for introducing gas from the inflator 42 (see FIG. 13), and a sheet-form expansion part 142 that covers each of the windows 31, 32, 33 (see FIG. 14) in the form of a curtain.

The expansion part 142 is provided with two supplementary secondary expansion parts 143, 144 for expanding to the lower side. The forward first secondary expansion part 143 and the rear second secondary expansion part 144 are supplementary components that expand below the lower edges 31b, 32b, 33b of the windows 31, 32, 33 when the expansion part 142 expands.

The expansion part 142 is further provided with two forward and rear primary inflation parts 146, 147 inflated by gas pressure. The two primary inflation parts 146, 147 can inflate in the widthwise direction of the vehicle (the direction from the front to the back of the page in FIG. 19).

The first primary inflation part 146 is positioned on the forward half of the expansion part 142 and protects the vehicle occupant 28 shown in FIG. 13. The first primary inflation part 146 inflates in a location facing the front seat 26 (the sitting location 26 of the vehicle occupant 28). The first primary inflation part 146 is composed of three chambers arranged in a single line in order from front to back: a forward chamber 151, a central chamber 152, and a rear chamber 153. The three chambers 151, 152, 153 are connected together at locations on upper portions thereof.

The second primary inflation part 147 is positioned on the rear half of the expansion part 142 and protects the vehicle occupant 29 shown in FIG. 13. The second primary inflation part 147 inflates in a location facing the back seat 27 (the sitting location 27 of the vehicle occupant 29). The second primary inflation part 147 is composed of two chambers arranged in a single line in order from front to back: a forward chamber 154 and a rear chamber 155. The two chambers 154, 155 are connected together at locations on the upper portions thereof.

The first secondary expansion part 143 is provided with a first secondary inflation part 148. The first secondary inflation part 148 adjoins the front of the first primary inflation part 146 and is formed continuously across the expansion part 142 and the first secondary expansion part 143. Therefore, the first secondary inflation part 148 can inflate from the upper end of the expansion part 142 to the lower end of the first secondary expansion part 143 in a location set apart from the sitting location 26. The first secondary inflation part 148 is in constant connection to the central chamber 152 of the first primary inflation part 146.

The second secondary expansion part 144 is provided with a second secondary inflation part 149. The second secondary inflation part 149 is positioned between the first primary inflation part 146 and the second primary inflation part 147, and is formed continuously across the expansion part 142 and the second secondary expansion part 144. Therefore, the second secondary inflation part 149 can inflate from the upper end of the expansion part 142 to the lower end of the second secondary expansion part 144 in a location set apart from the sitting location 27. The second secondary inflation part 149 is composed of two chambers arranged in a single line in order from front to back: a forward chamber 156 and a rear chamber 157. The two chambers 156, 157 are connected together at locations on upper portions thereof.

Gas fed from the inflator 42 (see FIG. 13) to the gas introduction part 145 flows out into the two primary inflation parts 146, 147 from the gas introduction part 145. As a result, the primary inflation parts 146, 147 inflate and are able to protect the vehicle occupants 28, 29.

Gas within the central chamber 152 of the first primary inflation part 146 flows into the first secondary inflation part 148. Additionally, gas from the gas introduction part 145 flows into the second secondary inflation part 149. Gas within the forward chamber 154 of the second primary inflation part 147 flows into the rear chamber 157 of the second secondary inflation part 149.

As a result, the two secondary inflation parts 148, 149 inflate across a wide area from the upper end of the expansion part 142 to the lower ends of each secondary expansion part 143, 144 when the expansion part 142 has expanded. The inflated secondary inflation parts 148, 149 can serve to function as reinforcing members for reinforcing the expansion part 142 and the secondary expansion parts 143, 144. In other words, the rigidity of the expansion part 142 and the secondary expansion parts 143, 144 increases due to the reinforcement provided by the inflated secondary inflation parts 148, 149.

A vehicle occupant protection apparatus 140 thus configured can be used, for example, as the vehicle occupant protection apparatus 40C of the first modification shown in FIGS. 16A and 16B. In such instances, the inflated first and second secondary inflation parts 148, 149 are laid across the space between the roof lining 24a and the door linings 18a, 19a shown in FIG. 16A. In other words, the expansion part 142 has high rigidity due to the support provided from the roof lining 24a and the door linings 18a, 19a via the secondary inflation parts 148, 149. Due to the high rigidity, the expansion part 142 tends not to slacken from the side of the vehicle cabin 12 outwards. As a result, the ability of the vehicle occupant protection apparatus 140 to protect the vehicle occupants can be further increased.

In the present invention, the shapes, dimensions, and numbers may be optimized for the primary inflation parts 70A, 70B, 146, 147, the secondary inflation parts 82, 84, 148, 149, and the like.

Additionally, the three internal-pressure-regulating inflation parts 73, 75, 78, the two secondary inflation parts 82, 84, and the like may have a mutually connected configuration instead of a mutually discrete configuration.

The quantity of break parts 85 through 89 may be optimized for each of the respective internal-pressure-regulating inflation parts 73, 75, 78, the respective secondary inflation parts 82, 84, and the like.

The configurations, shapes, and dimensions may be optimized for the break parts 85 through 89.

The vehicle occupant protection apparatuses 40, 40A, 40B, 40C, 40D, 140 of the present invention are ideal for use as side curtain airbags in station wagons, sedans, and other passenger vehicles.

Obviously, various minor changes and modifications of the present invention are possible in light of the above teaching. It is therefore to be understood that within the scope of the appended claims the invention may be practiced otherwise than as specifically described.

What is claimed is:

1. A vehicle occupant protection apparatus comprising an expansion part positioned in a folded state along an upper edge of a vehicle window and being capable of expanding in the form of a curtain along the window in a vehicle cabin in order to protect a vehicle occupant, wherein the expansion part has a primary inflation part that is inflated by the pressure of a gas, the primary inflation part comprising an occupant-protecting inflation part that inflates in a location facing the sitting location of the vehicle occupant, and an internal-pressure-regulating inflation part that is capable of being inflated by the gas from the occupant-protection inflation part in a location set apart from the sitting location, wherein the internal-pressure-regulating inflation part is in constant connection with the occupant-protecting inflation part via a communication channel having a reduced diameter to adjust the internal pressure of the occupant-protecting inflation part, the internal-pressure-regulating inflation part having a break part which is designed to break when subjected to a predetermined breaking force produced in accordance with an internal pressure of the internal-pressure-regulating inflation part generated by the gas flowing inside the internal-pressure-regulating inflation part, wherein when the break part has broken, the break part allows a further increase in the capacity of the internal-pressure-regulating inflation part and a corresponding reduction in the internal pressure of the internal-pressure-regulating inflation part to thereby adjust the internal pressure of the occupant-protecting inflation part of the expansion part, and wherein the break part sequentially breaks in a front-rear direction of the expansion part starting at an end of the break part facing the communication channel and proceeding to an opposite end of the break part.

2. The vehicle occupant protection apparatus of claim 1, wherein the break part is designed to increase a thickness of the internal-pressure-regulating inflation part when the break part has broken.

3. The vehicle occupant protection apparatus of claim 1, wherein the break part extends inward within the internal-pressure-regulating inflation part so as to divide an internal space of internal-pressure-regulating inflation part.

4. The vehicle occupant protection apparatus of claim 1, wherein the break part is provided to a lateral surface of the internal-pressure-regulating inflation part.

* * * * *